US012743905B2

(12) United States Patent
Nakade et al.

(10) Patent No.: US 12,743,905 B2
(45) Date of Patent: Sep. 22, 2026

(54) WEARABLE DEVICE AND BEHAVIOR EVALUATION SYSTEM

(71) Applicant: Maxell, Ltd., Kyoto (JP)

(72) Inventors: Mayumi Nakade, Kyoto (JP); Masuo Oku, Kyoto (JP); Sadao Tsuruga, Kyoto (JP); Yoshiharu Uchida, Kyoto (JP)

(73) Assignee: Maxell, Ltd., Kyoto (JP)

( * ) Notice: Subject to any disclaimer, the term of this patent is extended or adjusted under 35 U.S.C. 154(b) by 180 days.

(21) Appl. No.: 18/722,427

(22) PCT Filed: Dec. 22, 2021

(86) PCT No.: PCT/JP2021/047711
§ 371 (c)(1),
(2) Date: Jun. 20, 2024

(87) PCT Pub. No.: WO2023/119526
PCT Pub. Date: Jun. 29, 2023

(65) Prior Publication Data

US 2025/0087021 A1 Mar. 13, 2025

(51) Int. Cl.
*G06V 40/16* (2022.01)

(52) U.S. Cl.
CPC .......... *G06V 40/174* (2022.01); *G06V 40/161* (2022.01); *G06V 40/168* (2022.01)

(58) Field of Classification Search
CPC ...... G06T 7/00; G06V 40/161; G06V 40/168; G06V 40/174
See application file for complete search history.

(56) References Cited

U.S. PATENT DOCUMENTS

2008/0183525 A1 7/2008 Tsuji et al.
2018/0114063 A1 4/2018 Wexler et al.
(Continued)

FOREIGN PATENT DOCUMENTS

CN 115220613 * 10/2022 ......... G06F 3/04847
JP 2008-210363 A 9/2008
(Continued)

OTHER PUBLICATIONS

International Search Report received in PCT Application No. PCT/JP2021/047711, dated Mar. 15, 2022.
(Continued)

*Primary Examiner* — Zhiyu Lu
(74) *Attorney, Agent, or Firm* — Rimon P.C.

(57) ABSTRACT

Provided is a wearable device and a behavior evaluation system that are capable of measuring and evaluating a direct relationship between a wearer and a target person and making the wearer aware, etc., of behavior by clearly indicating an evaluation result. They also contribute to the Sustainable Development Goals (SDGs) of "health and well-being for all" by enabling maintenance of people's mental and physical health. A wearable device 1 is provided with: an imager 10 generating a subject image of a target person; a distance measurer 11 measuring a distance to the target person and obtaining distance data; a subject image processor processing a subject image so as to assign the wearer an expression evaluation score based on face expression obtained by recognizing a face of the target person in the subject image; a distance image processor obtaining the distance to the target person by analyzing a distance image to which the distance data has been mapped, and obtains a distance evaluation score corresponding to the distance; and an output processor performing an evaluation process for obtaining a behavior evaluation score evaluating the wear-
(Continued)

er's behavior from the expression evaluation score, the distance evaluation score, and the evaluation time of the wearer's behavior, and outputs the behavior evaluation score.

14 Claims, 17 Drawing Sheets

(56) References Cited

U.S. PATENT DOCUMENTS

| | | | | |
|---|---|---|---|---|
| 2020/0012999 | A1* | 1/2020 | Kang | G06Q 30/0639 |
| 2020/0255030 | A1 | 8/2020 | Yamamoto et al. | |
| 2021/0390333 | A1* | 12/2021 | Rama | G06V 40/172 |
| 2022/0036077 | A1* | 2/2022 | Rama | G06V 40/171 |
| 2022/0036566 | A1* | 2/2022 | Rama | G06F 18/22 |
| 2022/0383896 | A1 | 12/2022 | Hajiyev et al. | |
| 2024/0029473 | A1* | 1/2024 | Yabuuchi | G06V 40/174 |

FOREIGN PATENT DOCUMENTS

| | | | |
|---|---|---|---|
| WO | 2019/045022 | A1 | 3/2019 |
| WO | 2019/082926 | A1 | 5/2019 |
| WO | 2021/094330 | A1 | 5/2021 |

OTHER PUBLICATIONS

Hachisu, Taku et al., "Wearable Device for Measuring Face-to-Face Behavior via Infrared Communication", Transactions of the Virtual Reality Society of Japan [online], 2017 [retrieved on Mar. 7, 2022], vol. 22, No. 1, pp. 11-18, Retrieved from: J-STAGE, <DOI: https://doi.org/10.18974/tvrsj.22.1_11>.

Office Action dated Nov. 11, 2025 issued in corresponding Japanese patent application No. 2025-010531, 6 pages.

* cited by examiner

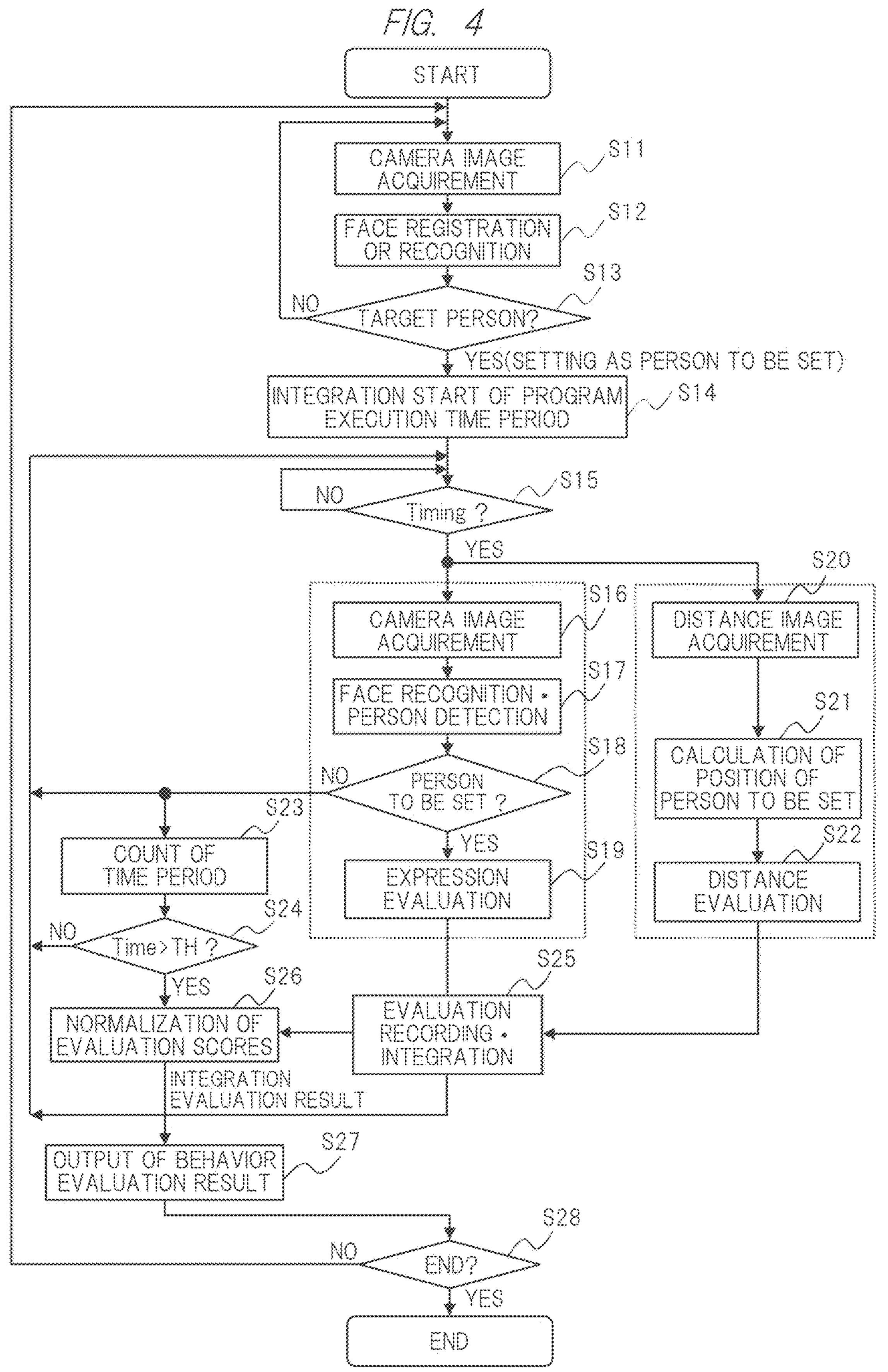
FIG. 4
START
CAMERA IMAGE ACQUIREMENT
S11
FACE REGISTRATION OR RECOGNITION
S12
TARGET PERSON?
S13
NO
YES(SETTING AS PERSON TO BE SET)
INTEGRATION START OF PROGRAM EXECUTION TIME PERIOD
S14
Timing ?
S15
NO
YES
CAMERA IMAGE ACQUIREMENT
S16
FACE RECOGNITION • PERSON DETECTION
S17
PERSON TO BE SET ?
S18
NO
YES
EXPRESSION EVALUATION
S19
DISTANCE IMAGE ACQUIREMENT
S20
CALCULATION OF POSITION OF PERSON TO BE SET
S21
DISTANCE EVALUATION
S22
COUNT OF TIME PERIOD
S23
Time>TH ?
S24
NO
YES
EVALUATION RECORDING • INTEGRATION
S25
NORMALIZATION OF EVALUATION SCORES
S26
INTEGRATION EVALUATION RESULT
OUTPUT OF BEHAVIOR EVALUATION RESULT
S27
END?
S28
NO
YES
END

| Category | LAUGHING | SMILE | DISPASSION | ANGER | WEEPING |
|---|---|---|---|---|---|
| Evaluation Points | 100 | 80 | 50 | 20 | 0 |

| distance | < 0.5m | < 1m | < 3m | < 10m | <= 10m |
|---|---|---|---|---|---|
| Evaluation Points | 100 | 80 | 50 | 20 | 0 |

51 DISTANCE IMAGE

NON-TARGET PERSON

53

50 CAMERA IMAGE

52b

52c

TARGET PERSON

| Service ID | 550e8400-e29b-41d4-a716-44665544000 | | |
|---|---|---|---|
| Score | 71 | | |
| Start Time | 2021-01-26T09:15:37 | | |
| Stop Time | 2020-01-26T12:00:12 | | |
| EXPRESSION EVALUATION | 50 | DISTANCE EVALUATION | 80 |
| EXPRESSION EVALUATION | 80 | DISTANCE EVALUATION | 50 |
| EXPRESSION EVALUATION | 80 | DISTANCE EVALUATION | 50 |
| EXPRESSION EVALUATION | 80 | DISTANCE EVALUATION | 50 |
| EXPRESSION EVALUATION | 80 | DISTANCE EVALUATION | 50 |
| EXPRESSION EVALUATION | 80 | DISTANCE EVALUATION | 50 |
| ⋮ | ⋮ | ⋮ | ⋮ |
| EXPRESSION EVALUATION | 0 | DISTANCE EVALUATION | 0 |
| EXPRESSION EVALUATION | 0 | DISTANCE EVALUATION | 0 |
| Score | | | |
| Start Time | 2021-01-26T013:22:46 | | |
| Stop Time | Running | | |
| EXPRESSION EVALUATION | 80 | DISTANCE EVALUATION | 80 |
| EXPRESSION EVALUATION | 100 | DISTANCE EVALUATION | 80 |
| EXPRESSION EVALUATION | 80 | DISTANCE EVALUATION | 50 |
| EXPRESSION EVALUATION | 20 | DISTANCE EVALUATION | 50 |
| EXPRESSION EVALUATION | 50 | DISTANCE EVALUATION | 20 |
| EXPRESSION EVALUATION | 50 | DISTANCE EVALUATION | 20 |
| ⋮ | ⋮ | ⋮ | ⋮ |

| Service ID | 550e8400-e29b-41d4-a716-44665544000 | | |
|---|---|---|---|
| Start Time | 2021-01-26T09:15:37 | | |
| Stop Time | 2021-01-26T12:00:12 | | |
| TARGET PERSON | A | Score | 62 |
| EXPRESSION EVALUATION | 80 | DISTANCE EVALUATION | 50 |
| EXPRESSION EVALUATION | 50 | DISTANCE EVALUATION | 20 |
| ⋮ | ⋮ | ⋮ | ⋮ |
| EXPRESSION EVALUATION | 20 | DISTANCE EVALUATION | 80 |
| TARGET PERSON | B | Score | 35 |
| EXPRESSION EVALUATION | 20 | DISTANCE EVALUATION | 50 |
| EXPRESSION EVALUATION | 50 | DISTANCE EVALUATION | 50 |
| ⋮ | ⋮ | ⋮ | ⋮ |
| EXPRESSION EVALUATION | 0 | DISTANCE EVALUATION | 0 |
| TARGET PERSON | C | Score | 75 |
| EXPRESSION EVALUATION | 80 | DISTANCE EVALUATION | 80 |
| EXPRESSION EVALUATION | 100 | DISTANCE EVALUATION | 80 |
| ⋮ | ⋮ | ⋮ | ⋮ |
| EXPRESSION EVALUATION | 0 | DISTANCE EVALUATION | 0 |
| TARGET PERSON | D | Score | 48 |
| EXPRESSION EVALUATION | 50 | DISTANCE EVALUATION | 30 |
| EXPRESSION EVALUATION | 50 | DISTANCE EVALUATION | 50 |
| ⋮ | ⋮ | ⋮ | ⋮ |
| EXPRESSION EVALUATION | 0 | DISTANCE EVALUATION | 0 |

73a 73b 73c 73d

74

| Start Time | 2021-01-26T13:22:46 | | |
|---|---|---|---|
| Stop Time | 2021-01-26T17:05:12 | | |
| TARGET PERSON | A | Score | 66 |
| EXPRESSION EVALUATION | 80 | DISTANCE EVALUATION | 50 |
| ⋮ | ⋮ | ⋮ | ⋮ |

WEARABLE DEVICE AND BEHAVIOR EVALUATION SYSTEM

CROSS-REFERENCE TO RELATED APPLICATIONS

This application is the U.S. National Phase under 35 U.S.C. § 371 of International Application No. PCT/JP2021/047711, filed on Dec. 22, 2021, the entire contents of which are hereby incorporated by reference.

TECHNICAL FIELD

The present invention relates to a wearable device and a behavior evaluation system.

BACKGROUND ART

Patent Document 1 proposes a system that detects, to measure a relationship between persons belonging to an organization, a state where persons respectively wearing face-to-face sensors face each other and that visualizes a degree of activation of the organization through generation, analysis, and the like of a face-to-face history of the persons.

Further, a wearable device, which shoots a forward background at an eye level of a person with a camera mounted thereon and produces a behavior such as sports as a content, i.e., so-called "Action Cam" has been commercially available.

Further, as described in Patent Document 2, for example, a distance measurement sensor (LiDAR: light detection and ranging), which irradiates laser light while scanning it and which measures an arrival time period and a phase difference of reflected light to obtain a distance from a background, has been known in a field of automatic driving of a vehicle. A case where the distance measurement sensor is adopted as a portable information device has also been known.

However, in a technique described in Patent Document 1, estimation of the degree of activation of the organization has been focused on, and utilization of a direct relationship between persons has not been referred to at all. Further, the technique described in Patent Document 1 has a problem in that face-to-face measurement between persons can be performed only by the persons respectively wearing the face-to-face sensors.

RELATED ART DOCUMENTS

Patent Documents

Patent Document 1: Japanese Patent Laid-Open No. 2008-210363

Patent Document 2: International Publication No. WO 2019-082926

SUMMARY OF THE INVENTION

Problems to be Solved by the Invention

As described above, Patent Document 1 does not describe utilization of a direct relationship between persons. Further, a technique described in Patent Document 1 has a problem in that all persons belonging to an organization must respectively wear face-to-face sensors.

An object of the present invention is to provide a wearable device capable of measuring and evaluating a direct relationship between a wearer and a target person and clearly indicating an evaluation result to become aware of, for example, a behavior of the wearer, and a behavior evaluation system.

Means for Solving the Problems

The outline of a typical one of inventions disclosed in the present application will be simply described as follows.

A wearable device according to a typical embodiment of the present invention includes: an imager that photographs a target person in front of or around a wearer to generate a subject image;

- a distance measurer that measures a distance between the wearer and the target person to acquire distance data;
- a subject image processor that performs detection and face recognition of the target person included in the subject image and processes the subject image to assign an expression evaluation score based on an expression of the face of the target person obtained by the face recognition to the wearer;
- a distance image processor that analyzes a distance image obtained by mapping the distance data to find a distance between the wearer and the target person and acquires a distance evaluation score corresponding to the distance; and
- an output processor that performs evaluation processing for finding a behavior evaluation score for evaluating a behavior of the wearer from the expression evaluation score, the distance evaluation score, and a behavior evaluation time period as a behavior time period of the wearer as an evaluation target and outputs the behavior evaluation score.

A behavior evaluation system according to a typical embodiment of the present invention includes:

- the above-described wearable device; and
- a server that acquires the behavior evaluation score outputted from the output processor and provides the acquired behavior evaluation score to an external apparatus possessed by a person concerned with the target person.

Effects of the Invention

An effect obtained by a typical one of the inventions disclosed in the present application will be simply described as follows.

That is, according to a typical embodiment of the present invention, there can be provided a wearable device having a behavior evaluation function capable of measuring and evaluating a direct relationship between a wearer and a target person and clearly indicating an evaluation result to become aware of, for example, a behavior of the wearer, and a behavior evaluation system.

BRIEF DESCRIPTIONS OF THE DRAWINGS

FIG. 4 is a flowchart for illustrating an operation of the head mounted display in a first embodiment;

FIG. 10A is a diagram illustrating a display example of the accumulated behavior evaluation result;

FIG. 10B is a diagram illustrating a display example of the accumulated behavior evaluation result;

FIG. 15 is a diagram for explaining a data configuration of a behavior evaluation result;

FIG. 18 is a flowchart illustrating an example of a processing to be performed by a wearable device in a fourth embodiment;

FIG. 19 is a diagram for explaining a configuration of a database of evaluation results respectively behavior corresponding to a plurality of target persons.

DETAILED DESCRIPTION OF PREFERRED EMBODIMENTS

Figure 1:
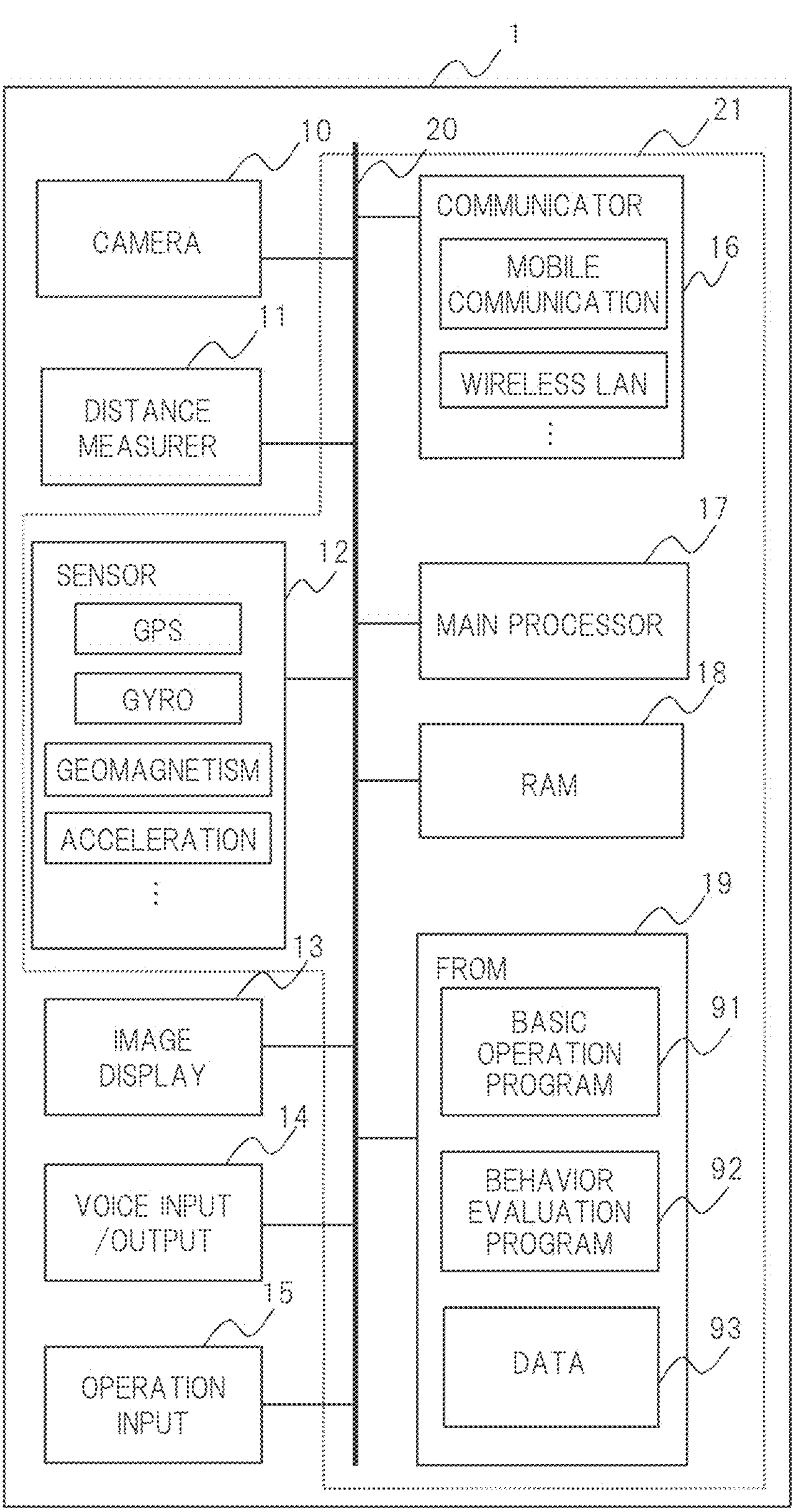
FIG. 1 is a block configuration diagram of a wearable device according to a first embodiment.

In embodiments and examples disclosed below, devices, a system, and the like that analyze and evaluate a degree of contact between persons and promote a behavior of a user to contribute to metal health of the user and health maintenance of a contact target person. Further, a technique according to the present disclosure makes it possible to maintain mental health and physical health of a person, thereby contributing to "Good Health and Well-Being" in the SDGs (sustainable development goals) advocated by the United Nations.

In the following embodiments, a wearable device is used to analyze a degree of contact between persons. Specifically, a degree of contact between a user wearing a wearable device (hereinafter referred to as a "wearer") and a person shot or recognized by the wearable device (hereinafter referred to as a "target person") is found through image analyses such as person detection and face recognition.

Here, a degree of contact between a wearer and a target person (i.e., a person and a person) is calculated as a "behavior evaluation score" using as elements an expression of the face of the target person obtained by face recognition, a distance between the wearer and the target person, a time period during which the wearer has performed a behavior with respect to the target person, and the like. This "behavior evaluation score" can be calculated by finding an "expression evaluation score" based on the expression of the face of the target person, a "distance evaluation score" corresponding to the distance between the wearer and the target person, a "behavior evaluation time period" as a behavior time period of the wearer as an evaluation target, and the like and substituting the scores and the time period into a predetermined equation, for example, to perform a calculation. The calculated "behavior evaluation score" is a point obtained by comprehensively evaluating a behavior (a degree of contact) of the wearer with respect to the target person, and the point is exhibited to the wearer, for example, to urge the behavior of the wearer, thereby making it possible to contribute to maintenance of mental health and physical health of each of the wearer and the target person.

More specifically, to find the above-described "expression evaluation score", the wearable device includes an imager that shoots a target person in front of or around a wearer to generate a subject image, and a subject image processor that perform detection and face recognition of the target person included in the subject image and processes the subject image to assign an expression evaluation score based on an expression of the face of the target person obtained by the face recognition to the wearer.

Further, in order to find the above-described "distance evaluation score", the wearable device includes a distance measurer that measures a distance between a wearer and a target person to acquire distance data, and a distance image processor that analyzes a distance image obtained by mapping the distance data to find the distance between the wearer and the target person and acquires a distance evaluation score corresponding to the distance.

Further, in order to find and output the above-described "behavior evaluation score", the wearable device includes an output processor that performs an evaluation processing for finding a behavior evaluation score for evaluating a behavior of a wearer from an expression evaluation score, a distance evaluation score, and a behavior evaluation time period as a behavior time period of a wearer as an evaluation target and outputs the behavior evaluation score.

Among the foregoing, the "subject image processor", the "distance image processor", and the "output processor" can be implemented by a processor (a CPU, etc.) mounted on the wearable device or an external server. Although the apparatuses can be respectively implemented by either the same processors or separate processors, the following presupposes an example in which the apparatuses are each implemented by a single processor mounted on the wearable device.

The above-described configuration makes it possible to measure and evaluate a direct relationship between the wearer and the target person without the target person wearing an apparatus such as a sensor and output an evaluation result.

Embodiments of the present invention will be described below with reference to the drawings. Each of the embodiments described below in the drawings is one example for implementing the present invention, and does not limit a technical scope of the present invention. Note that in the embodiments, members having the same function are respectively denoted by the same reference numeral, and repetitive description thereof will be omitted, except when especially necessary.

First Embodiment

Hereinafter, a first embodiment will be described with reference to FIGS. 1 to 10. The first embodiment discloses a wearable device to be worn by a user (hereinafter solely referred to as a "wearer"). The wearable device includes an imager such as a camera and a distance measurer such as a distance measurement sensor, and has a behavior evaluation function for measuring a degree of association between a person (target person) captured by each of the apparatuses and the wearer.

(Block Diagram and Use Scene)

FIG. 1 is a block configuration diagram of a wearable device according to a first embodiment.

As illustrated in FIG. 1, a wearable device 1 according to the first embodiment includes a camera 10 (an imager), a distance measurer 11, a sensor 12, an image display 13, a voice input/output 14, an operation input 15, a communicator 16, a main processor 17, a RAM 18, and a flash ROM (FROM) 19.

The main processor 17 is a main controller that controls the entire wearable device 1 according to a predetermined program. The main processor 17 is implemented by a CPU (central processor unit) or a microprocessor unit (MPU). The main processor 17 performs an operation control processing for the entire wearable device 1 by executing programs such as an operating system (OS) stored in a storage 110 and various types of operation control applications. Further, the main processor 17 controls a startup operation of each of various types of applications.

Among them, the sensor 12, the communicator 16, the main processor 17, the RAM 18, and the flash ROM (FROM) 19 each function as a controller or a controller 21 (see a dotted line frame in FIG. 1) in the wearable device 1.

In the wearable device 1, the camera 10 is an imager that shoots a target person in front of or around the wearer to generate a subject image.

In one specific example, the camera 10 includes an image sensor such as CCDs (charge coupled apparatuses) and a CMOS (complementary metal oxide semiconductor) and an optical lens, for example. In this case, the camera 10 shoots a background in front of a line of sight of the wearer within a range of its angle of view (also see FIGS. 2 and 3 as appropriate). Accordingly, when a surrounding target person not positioned in front of the line of sight is shot, the face or the body of the wearer is directed toward the target person desired to be shot.

On the other hand, in the wearable device 1, the distance measurer 11 is a distance measurer generally referred to as a distance sensor or a distance measurement sensor, and has a function of measuring a distance between the wearer and the target person to acquire distance data.

In one specific example, the distance measurer 11 is an apparatus including a distance measurement sensor (also referred to as an optical radar) such as LiDAR (light detection and ranging).

The distance measurer 11 has, for example, a configuration in which laser light is irradiated to be scanned from a light source (a laser diode, etc.) in a sensor to measure a time period elapsed until reflected light reflected by a measurement object is received by a light receiving element in the sensor. According to the distance measurer 11 having such a configuration, a distance from a background (various objects and persons, etc.) in front of the line of sight of the wearer is measured to acquire distance data. Further, the distance measurer 11 maps the distance data from the measurement object, which has been acquired by the measurement, in two dimensions, to generate a distance image.

The sensor 12 includes various sensors other than the above-described distance measurement sensor (the distance measurer 11), e.g., a GPS sensor, a gyro sensor, a geomagnetic sensor, and an acceleration sensor, as referenced by FIG. 1. Note that a configuration of each of the above-described sensors in the sensor 12 is known, and is hardly associated with the first embodiment, and hence detailed description thereof will be omitted.

The image display 13 functions to display an image to be generated by the controller 21. Here, although there are various images to be generated by the controller 21 and displayed, examples include an image of a behavior evaluation result of the wearer in the present embodiment, and details of the image will be described below.

The voice input/output 14 includes a microphone (hereinafter abbreviated as "mike" in Japanese) that inputs (absorbs) a voice and a speaker that outputs (emits) a voice. In the present embodiment, it is also possible to voice-output the above-described behavior evaluation result from the speaker in the voice input/output 14 and to notify the wearer of such a result.

As the operation 15, various apparatuses for inputting an operation by the wearer can be used. For example, the operation input 15 may be any one of apparatuses such as a touch sensor that inputs an operation of the finger of the wearer, a microphone that inputs a voice of the wearer, and a sensor that detects movement of the hand of the wearer captured with the camera 10, and may be further a combination of a plurality of these.

The communicator 16 includes a wireless LAN that performs 4G (generation) or 5G mobile communication, for example. The communicator 16 selects appropriate processing from among communication protocols, and connects the wearable device 1 to a network or the like when required.

The FROM 19 is a non-volatile memory medium, and includes a basic operation program 91 and a behavior evaluation program 92 (which may be hereinafter merely referred to as processing programs 91 and 92) as a processing program to be executed by the main processor 17 and a data 93 storing various data.

The processing programs 91 and 92 are executed by being read out by the main processor 17 and loaded into the RAM 18. The data 93 stores data required to execute the processing program 91 and 92. The FROM 19 may be one memory medium as illustrated, or may be constituted by a plurality of memory media. Further, the FROM 19 may be a non-volatile memory medium other than a flash ROM.

Figure 2:
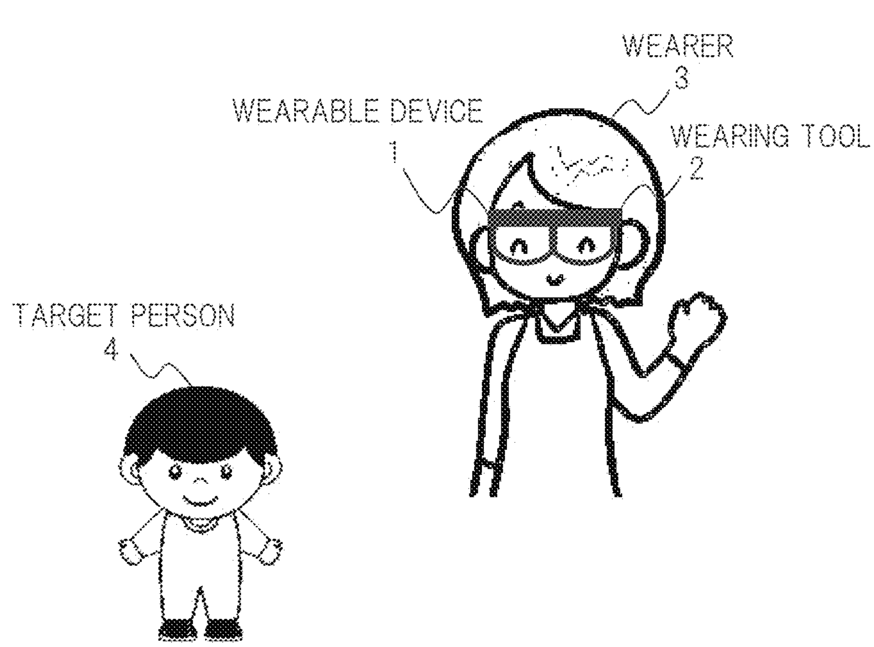
FIG. 2 is a diagram for illustrating a relationship between a wearer of the wearable device and a target person.

FIG. 2 is a diagram for illustrating a relationship between a wearer of a wearable device and a target person. Referring to FIG. 2, a wearer 3 wearing a wearable device 1 and a target person 4 as a target of a behavior and a behavior evaluation of the wearer 3 are illustrated.

In an illustrated example, a case where the wearer 3 is a parent, the target person 4 is a baby, and the behavior (and thus the type of the behavior evaluation) of the wearer 3 is child-rearing will be described. Further, description will be made below on the premise of a case where the wearable device 1 is a head mounted display (HMD).

The wearer 3 can hold the wearable device 1 without shifting nor dropping from his or her face using a wearing tool 2 such as a fastener, as needed. Further, the wearing tool 2 may have a form in which the wearable device 1 is worn on the head of the wearer 3, like a headband, or may have a configuration in which the wearable device 1 (the HMD in this example) and the wearing tool 2 are integrated with each other.

Thus, the wearable device 1 captures (shoots) the target person 4 with the camera 10 (see FIG. 1) and executes the processing programs 91 and 92, to evaluate a behavior of the wearer 3 toward the target person 4 and record a result of the behavior evaluation (which may be hereinafter referred to as a "behavior evaluation result" or abbreviated as an "evaluation result" as appropriate).

According to the present embodiment, when the wearable device 1 is the HMD, the behavior evaluation result can be outputted to a display of the HMD, i.e., a screen to be displayed in front of the eyes of the wearer 3. Accordingly, the wearer 3 can use the wearable device 1 in a hands-free manner.

Figure 3:
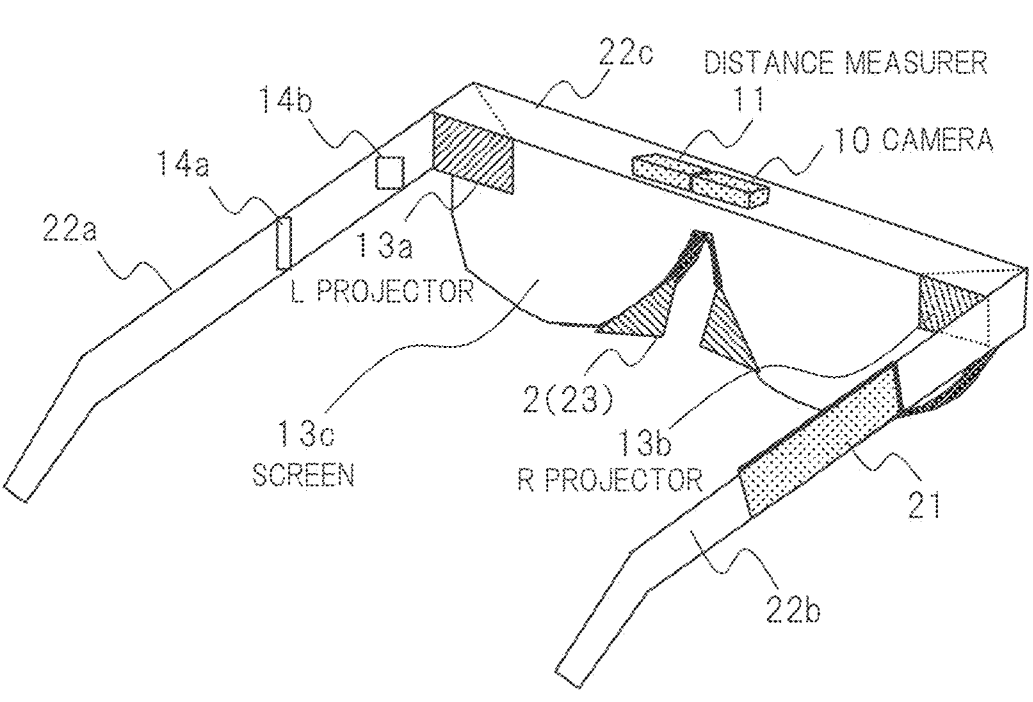
FIG. 3 is a perspective view illustrating a configuration of a head mounted display (HMD) as a form of the wearable device.

FIG. 3 illustrates an example of an external view of an HMD as one form of a wearable device.

Referring to FIGS. 1 and 3, the wearable device 1 (HMD) includes the camera 10, the distance measurer 11, the image display 13, the voice input/output 14, the operation input 15, and the controller 21 having various blocks (see a dotted line frame in FIG. 1). Among them, the image display 13 is mounted as projectors 13*a* and 13*b* and a main screen display 13*c* (a semi-transmissive screen in this example), as illustrated in FIG. 3. Further, the camera 10 and the distance measurer 11 are arranged side by side at a substantial center of an upper portion of a housing (a front frame 22*c*) of the HMD. The controller 21 is provided in a horizontal frame 22*b* on one side, i.e., the right side in this example corresponding to each of temples of (eyeglasses) of the HMD.

Further, as components constituting the voice input/output 14 described in FIG. 1, a speaker 14*a* and a microphone 14*b* are provided in a horizontal frame 22*a* on the other side (the left side in this example) corresponding to each of the above-described temples. Further, as referred to in FIG. 3, the front frame 22*c* is provided with the L projector 13*a* on the left side, the R projector 13*b* on the right side, and the main screen display 13*c* having a larger area than those of the projectors 13*a* and 13*b* as the image display 13.

Further, a nose pad 23 as a component constituting the wearing tool 2 described above in FIG. 2 is provided at the center of the main screen display 13*c*. A user wears the HMD 1 on his/her own face (head) by wearing respective distal end sides of the horizontal frames 22*a* and 22*b* on both his/her ears and placing the nose pad 23 on his/her nose.

Among the foregoing, the main screen display 13*c* is a semi-transmissive screen in this example, but may be a non-transmissive display as another example. In either case, the user can confirm a forward background through the main screen display 13*c*.

Note that although an example in which a display is constituted by a semi-transmissive screen and a projector has been described above, the display may be, for example, a retinal projection display that performs projection onto the retina of a user without using a screen. Examples of the non-transmissive display include a display using a laser, a liquid crystal panel, an organic EL (emitting diode), or the like, and a system for the user to directly see a display through a lens or the like may be used.

Here, when the main screen display 13*c* is the semi-transmissive screen, the user visually recognizes a forward background that has been transmitted by the semi-transmissive screen. On the other hand, when the main screen display 13*c* is a non-transmissive display, the user displays a camera image obtained by shooting a forward background on the non-transmissive display, to confirm the forward background.

The camera 10 is attached to the front frame 22*c* (the housing) of the HMD in order to shoot a background in front of a line of sight of the user. Further, the distance measurer 11 arranged adjacent to the camera 10 measures a distance from an object in the background in front of the line of sight of the user.

The controller 21 inputs an image shot with the camera 10 (hereinafter referred to as a "camera image") and a distance image generated by the distance measurer 11, and supplies the images to the memory (the RAM 18 or the data 93) and the main processor 17 inside thereof. Further, the controller 21 generates an image to be projected or displayed on the above-described image display 13 (the L projector 13*a*, the R projector 13*b*, and the main screen display 13*c*) and a sound to be outputted from the speaker 14*a*.

In a relationship with the above-described characteristic portion, the controller 21, particularly, the main processor 17 performs respective functions of a "subject image processor", a "distance image processor", an "output processor", and the like.

Although the controller 21, the camera 10, the distance measurer 11, the speaker 14*a*, and the microphone 14*b* are respectively arranged in the corresponding frames 22*a* to 22*c*, as described above, respective arrangement locations of these portions may not necessarily be as illustrated in FIG. 3.

(Flowchart)

FIG. 4 is a flowchart for illustrating an operation of the head mounted display in the first embodiment. The flowchart illustrated in FIG. 4 illustrates a flow of processes based on the behavior evaluation program 92, and mainly the main processor 17 into which the behavior evaluation program 92 is read is a subject of the processes. Then, a corresponding block of the wearable device 1 operates according to a control signal to be outputted from the main processor 17, to perform each of the processes in the flowchart.

The main processor 17 outputs control information to the camera 10 to acquire a camera image in step S11 after the start of execution of the behavior evaluation program 92. The camera image may be acquired in synchronization with timing of shooting with the camera 10, or the image may be acquired at any timing by continuously performing image shooting at 30 fpS (frame per second), for example.

In subsequent step S12, the main processor 17 subjects a face captured in the acquired camera image to new face data registration processing or face recognition processing based on comparison with face data already registered. Here, the main processor 17 can perform processing for assigning and registering an identification number of a target person on the basis of an operation content of the operation input 15 by a user (wearer) when registering new face data.

In step S13, the main processor 17 determines whether or not the target person has been registered or recognized.

Here, if it is determined that the target person has been neither registered nor recognized (step S13: NO), the main processor 17 judges that the face captured in the camera image is not the face of the target person or no face is captured in the camera image. In this case, the processing returns to step S11, and the main processor 17 repeats processes in steps S11 to S13 described above in order to reacquire the camera image.

On the other hand, if it is determined that the target person has been registered or recognized (step S13: YES), the main processor 17 specifies (sets) the target person as a behavior target of the user (wearer), and the processing proceeds to step S14.

In step S14, the main processor 17 starts to integrate a program execution time period.

In subsequent step S15, the main processor 17 determines whether or not timing having a predetermined cycle has arrived.

Here, if it is determined that the timing having the predetermined cycle has not arrived (step S15: NO), the main processor 17 repeats the determination in step S15 until it determines that the timing having the predetermined cycle has arrived (step S15: YES).

Then, if it is determined that the timing having the predetermined cycle has arrived (step S15: YES), the main processor 17 performs camera image processing processes (steps S16 to step S19) and distance image processing processes (step S20 to Step S22) described below.

Note that FIG. 4 illustrates multi-process processing for the main processor 17 to perform the camera image processing processes (step S16 to step S19) and the distance image processing processes (step S20 to step S22) in parallel (in a simultaneous parallel manner). As another example, the main processor 17 may be configured to perform a serial processing, e.g., may perform the distance image processing processes (step S20 to step S22) after the camera image processing processes (step S16 to step S19).

(Camera Image Processing Processes)

In step S16 at the time of the start of the camera image processing processes, the main processor 17 acquires a camera image shot with the camera 10. In subsequent step S17, the main processor 17 performs a recognition processing of a face captured in the acquired camera image and a detection processing of a person.

Then, in step S18, the main processor 17 determines whether or not the target person set in step S13 (hereinafter also referred to as a "person to be set") has been captured in the acquired camera image. More specifically, in step S18, the main processor 17 checks a result of the detection or the recognition in step S17. In one specific example, the main processor 17 determines whether or not a person has been detected in a camera image and determines whether or not the person is a person to be set when detected. Alternatively, the main processor 17 determines whether or not a face has been recognized in a camera image and whether or not the face is the face of a person to be set when recognized.

Further, if it is determined that the face of the person detected in the camera image can be recognized, the main processor 17 determines whether or not the person is the person to be set from a result of the face recognition. On the other hand, if the face of the person detected in the camera image is unclear (the face recognition cannot be performed), for example, if the detected person is directed backward, the main processor 17 estimates whether or not the detected person is the person to be set.

In order to perform such an estimation, the main processor 17 judges respective similarities of a color and a texture of clothing of a person recognized immediately before (at the time of setting of the target person (person to be set) before step S14), a body balance between a face and a body, validity of a movement distance considering a motion vector, and the like. The detected target person shares a position and a size in an image with the distance image processing processes (see step S25).

Thus, if it is determined that the person to be set (set target person) has not been captured in the camera image (step S18: NO), the processing returns to step S15, and the main processor 17 performs processes in step S23 and subsequent steps. Note that respective contents of the processes in step S23 and subsequent steps will be described below.

On the other hand, if the main processor 17 determines that the person to be set (set target person) has been captured in the camera image (step S18: YES), the processing proceeds to steps S19. In step S19, the main processor 17 acquires an expression evaluation score on the basis of an expression of the recognized face of the person to be set. In one specific example, the main processor 17 acquires an expression evaluation score using a table in which a category (laugh, angry, cry, etc.) of an expression of a face and an expression evaluation score are associated with each other. An example of this table will be described below with reference to FIG. 6.

Alternatively, the main processor 17 may correct or calculate an expression evaluation score in consideration of another gesture of the person to be set while using the expression of the face of the person to be set as a basis. Here, the "other gesture" of the person to be set includes a degree of emotion of a voice (a so-called tone of voice) produced by the person to be set and an emotion expression by a gesture of a hand (arm) or a body of the person to be set captured in the camera image, for example. In this case, the main processor 17 adds a score based on the above-described other gesture to the expression evaluation score obtained to correspond to the expression of the face of the person to be set, to acquire a final expression evaluation score.

(Distance Image Processing Processes)

In step S20 at the time of the start of the distance image processing processes, the main processor 17 acquires a distance image measured by the distance measurer 11.

In subsequent step S21, the main processor 17 receives or appropriately refers to existence information of the person to be set obtained in the above-described camera image processing processes (step S18, etc.) and a position of the person to be set in the camera image. By such processing, the main processor 17 acquires or calculates a more accurate three-dimensional coordinate position of the person to be set in front of the user (wearer), to acquire a distance between the wearer and the person to be set. Then, in step S22, the main processor 17 acquires a distance evaluation score on the basis of the distance between the wearer and the person to be set.

(Processing Such as Integration of Evaluation Score)

In step S25 after the expression evaluation score has been acquired in step S19 and the distance evaluation score has been acquired in step S22, the main processor 17 records and integrates each of the evaluation scores. In such recording and integration processing, each of the evaluation scores may be recorded (integrated) on the data 93 in the wearable device 1, or may be recorded (integrated) on a recording medium of a server via a network.

If it is determined that the person to be set has not been captured in the camera image (the person to be set cannot be confirmed) in the above-described camera image processing process (step S18: NO), the processing returns to step S15, and the main processor 17 reacquires a camera image and a distance image, and performs processes in step S23 and subsequent steps.

In step S23, the main processor 17 starts to count a time period during which the person to be set cannot be confirmed (a time period during which the determination of step S18: NO is repeated). In subsequent step S24, the main processor 17 determines whether or not the counted time period has exceeded a threshold value TH.

Here, if it is determined that the counted time period has not yet exceeded the threshold value TH (step S24: NO), the processing returns to step S15, and the main processor 17 repeats the above-described processes. On the other hand, if it is determined that the counted time period has exceeded the threshold value TH (step S24: YES), the main processor 17 judges that a behavior of the user (wearer) toward the person to be set has almost been finished, and the processing proceeds to step S26.

In step S26, the main processor 17 calculates respective statistics of the evaluation scores recorded (integrated) in step S25 described above. In one specific example, the main processor 17 calculates a value obtained by normalizing each of the evaluation scores (the expression evaluation score and the distance evaluation score) recorded (integrated) at the time point by a behavior evaluation time period (e.g., an execution time period of a program).

The main processor 17 outputs the calculated value as a behavior evaluation result (step S27), and the processing proceeds to step S28.

In step S28, the main processor 17 determines whether or not an end reason of the program has occurred. Examples of the "end reason" include a case where shutdown of the program by an input operation of the user (wearer) and a command to turn off power have been received.

Here, if it is determined that the end reason of the program has not yet occurred (step S28: NO), the main processor 17 judges that work or the like of the user (wearer) has not yet been finished, and the processing returns to step S11. The main processor 17 repeats the above-described processes. In this case, the main processor 17 initializes a program execution time period (a behavior evaluation time period for the user (wearer)) and starts to integrate the time period in step S14 to be performed again.

On the other hand, if it is determined that the end reason of the program has occurred (step S28: YES), the main processor 17 judges that the work or the like of the user (wearer) has been finished, to finish a series of processes illustrated in FIG. 4.

(Example of Evaluation and Display)

Figures 5, 6, 7:
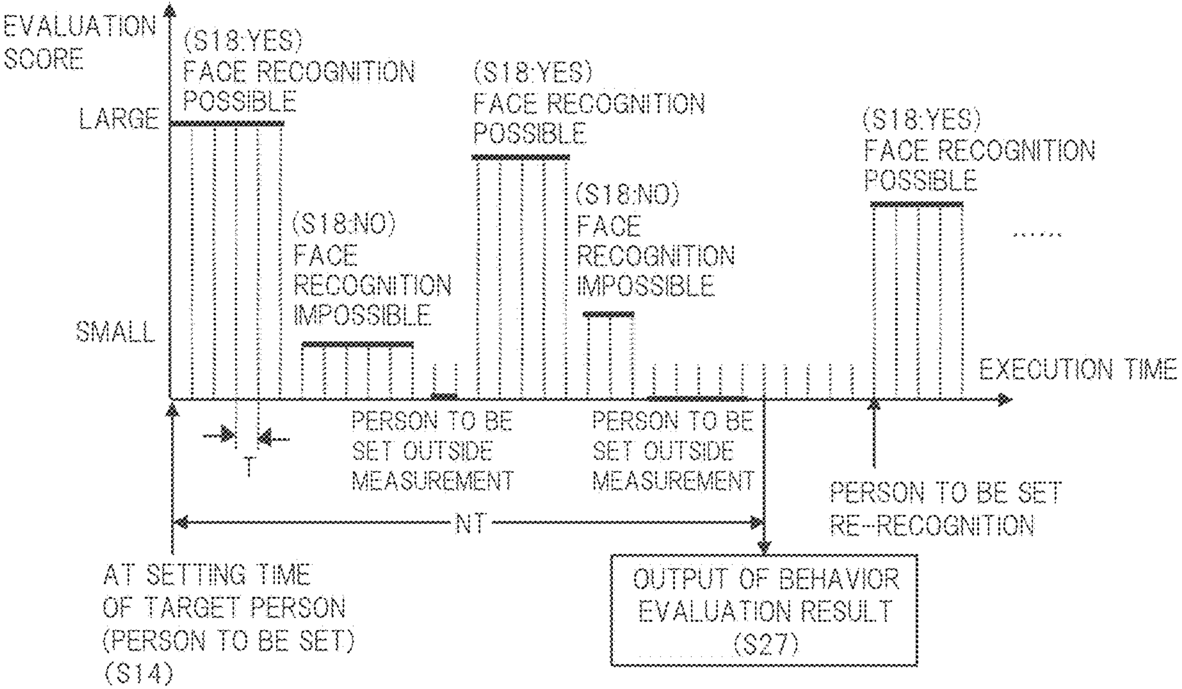
FIG. 5 is a graph for illustrating how an evaluation score for a behavior of the wearer of the wearable device shifts with time.
FIG. 6 is a diagram illustrating a table in which a category of an expression of a target person (a person to be set) and an expression evaluation score are associated with each other.
FIG. 7 is a diagram illustrating a table in which a distance between a wearer and a target person (person to be set) and a distance evaluation score are associated with each other.

FIG. 5 is a graph for explaining how an evaluation score for a behavior of a wearer of a wearable device shifts with time. In the graph illustrated in FIG. 5, a vertical axis represents an evaluation score, and a horizontal axis represents a shift with time or an execution time period of a program (a behavior evaluation time period of the wearer). Further, for ease of understanding, respective step numbers of the processes illustrated in FIG. 4 are appropriately added to FIG. 5.

As illustrated in FIG. 5, the main processor 17 in the wearable device 1 starts evaluation for the behavior of the wearer (assignment of the evaluation score and recording and integration thereof) from a time point where a person (target person) in a camera image has been recognized and set as a person to be set (when the determination is YES in step S18 first performed).

Further, the above-described camera image processing processes and distance image processing processes, for example, are performed for each predetermined cycle T illustrated in FIG. 5, and the main processor 17 obtains an evaluation score for each cycle T. Here, the cycle T corresponds to timing at which the determination is YES in step S15.

Then, the "evaluation score" represented by the vertical axis in the graph illustrated in FIG. 5 is an added value of an expression evaluation score and a distance evaluation score. Here, when face recognition can be generally performed, the expression evaluation score is added. Accordingly, the evaluation score is high (see an evaluation score "Face Recognized (S18: YES)" in FIG. 5). On the other hand, if a person to be set cannot be specified by the face recognition, the evaluation score is only the distance evaluation score. Accordingly, the evaluation score is relatively low (see an evaluation score "Face Unrecognizable" (S18: NO) in FIG. 5).

Further, in the example illustrated in FIG. 5, when the person to be set has not been captured in the camera image (see a branch of step S18: NO in FIG. 4 as appropriate), and the target person has not been captured even in a distance image, the evaluation score is zero (see an evaluation score "outside measurement of person to be set" in FIG. 5). Then, if a time period of "outside measurement of person to be set" (here, a time period during which an evaluation score is zero) exceeds a threshold value TH (see step S24 in FIG. 4 as appropriate), a value based on integration of an evaluation result in a first time period (see a period "NT" illustrated in FIG. 5) is outputted as a behavior evaluation result (see steps S26 and S27 in FIG. 4 as appropriate).

In the foregoing, the period "NT" illustrated in FIG. 5 corresponds to "behavior evaluation time" as a behavior time period of the wearer as an evaluation target.

Further, if the person to be set is then detected in the camera image or the distance image (see step S18: YES in FIG. 4 and "re-recognition of person to be set" in FIG. 5), an expression evaluation or a distance evaluation in a next behavior period (a new behavior evaluation period) of the wearer is recorded and integrated (see step S25, etc. in FIG. 4).

When such processes are repeated, points (behavior evaluation scores) obtained by comprehensively evaluating a behavior (a degree of contact) of the wearer with respect to the target person (person to be set) are recorded and stored in time series, and a behavior evaluation result is outputted for each behavior evaluation period.

Note that a method for assigning the behavior evaluation score, timing of executing the program, and the like are not limited to those in the above-described example, but may be set as follows, for example. That is, if the target person (person to be set) is not captured in the camera image (in a case of step S18: NO in FIG. 4), the evaluation score is set to zero even when the person to be set can be detected in the distance image. In this case, if a period during which the target person has not been captured in the camera image is a predetermined period or more (see step S24 in FIG. 4 as appropriate), execution of the program is paused and a behavior evaluation result is outputted. Then, when the target person is re-recognized in the camera image, the behavior evaluation is resumed.

FIG. 6 is a diagram illustrating a table in which a category of an expression of a target person (a person to be set) and an expression evaluation score are associated with each other. Such a table can be used for the above-described expression evaluation process in step S19. In the table illustrated in FIG. 6, a category (Category) of an expression is set in an upper stage, and an expression evaluation score (Evaluation Points) corresponding thereto is set in a lower stage. In this example, the expression evaluation score is an average value (50 in this example) when the category of the expression is "calm", the expression evaluation scores respectively corresponding to "smile" and "laugh" increase in this order (respectively 80 and 100 in this example), and the expression evaluation scores respectively corresponding to "anger" and "cry" decrease in this order (respectively 20 and 0).

FIG. 7 is a diagram illustrating a table in which a distance between a wearer and a target person (person to be set) and a distance evaluation score are associated with each other. This table can be used for the above-described distance evaluation process in step S22. In the table illustrated in FIG. 7, a distance from the person to be set is set in an upper stage, and a distance evaluation score (Evaluation Points) corresponding thereto is set in a lower stage. In this setting example, the distance evaluation score is the higher evaluation score (100) when the distance from the person to be set is close to "less than 0.5 m", and the evaluation scores respectively corresponding to the distances "less than 1 m", "less than 3 m", "less than 10 m", and "10 m or more" decrease in this order to be respectively "80", "50", "20", and "0".

Figure 8:
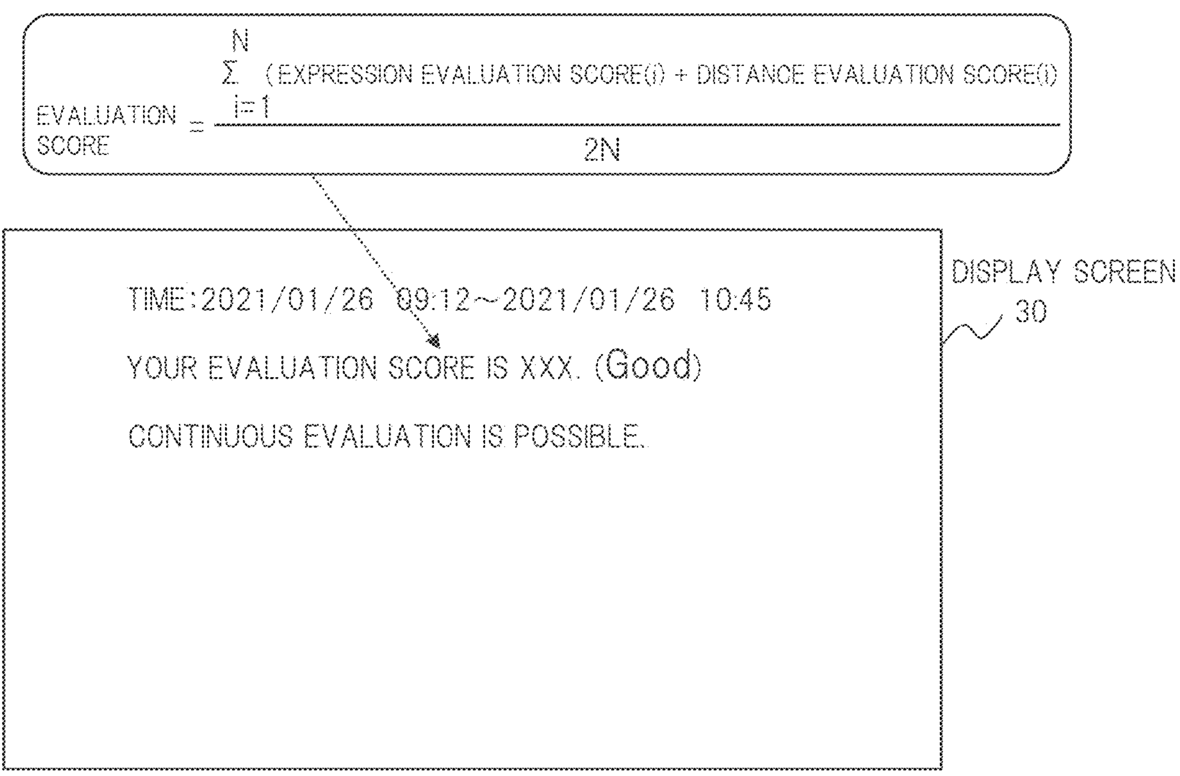
FIG. 8 is a diagram illustrating a display example of a behavior evaluation result for the wearer of the wearable device.

FIG. 8 is a diagram illustrating a display example of a behavior evaluation result for a wearer of a wearable device. A display screen 30 illustrated in FIG. 8 is displayed on the image display 13 in the wearable device 1 at the time of the process in step S27 described above in FIG. 4, for example. For ease of understanding, an example of a calculation equation for calculating the behavior evaluation result is illustrated above the display screen 30 in FIG. 8.

In the illustrated example, a behavior evaluation score is found by integrating each of an expression evaluation score (i) and a distance evaluation score (i) recorded at each timing, calculating a statistic of each of such integrated values, and normalizing the calculated statistic by the above-described behavior evaluation time period (see, i.e., the period NT illustrated in FIG. 5). In this calculation (operation) is performed by the main processor 17 in step 26 illustrated in FIG. 4, described above.

Here, the "statistic" calculated by the main processor 17 may be an average value such as an addition average value or a weighted average value. In a case of the addition average value, the main processor 17 addition-averages each of the integrated expression evaluation score and distance evaluation score to calculate an addition average value (see the equation illustrated in FIG. 8). Alternatively, in a case of the weighted average, the main processor 17 applies a predetermined coefficient (a weight value) to an element constituting the integrated expression evaluation score (or distance evaluation score), e.g., each of the evaluation scores (Evaluation Points) described above in FIG. 6 (e.g., more highly evaluates "laugh" or more highly evaluates a distance "less than 0.5 m") to calculate a weighted average value.

Then, the main processor 17 normalizes the addition average value (or the weighted average value) calculated in the above-described manner by being divided using a program execution time period N (a value substantially equal to the above-described behavior evaluation time period) to calculate a behavior evaluation score. Thus, the calculated behavior evaluation score is displayed at a position "XXX" in the display screen 30.

Further, the display screen 30 illustrated in FIG. 8 indicates a case of a simple display format. "Time" in the display screen 30, i.e., a time zone from 9:12 a.m. on Jan. 26, 2021 to 10:45 a.m. on the same day in this example is equal to a time zone during which the program described above in FIG. 4 has been executed and a time zone during which a behavior of the wearer has been evaluated.

More specifically, on the display screen 30 illustrated in FIG. 8, there are displayed: a behavior evaluation score calculated by normalization; a general comment on a behavior evaluation result ("Good" in this example); and an additional comment "continuous evaluation is possible" besides the above-described "time". The illustrated additional comment is a message indicating that a behavior can be continuously evaluated when a person to be set is re-recognized.

Note that a graphic display format in which a shift with time of an evaluation is graphically displayed, as illustrated in FIG. 5, for example, may be selectable as another display format of the display screen 30 to be displayed on the image display 13 in the wearable device 1.

Figure 9:
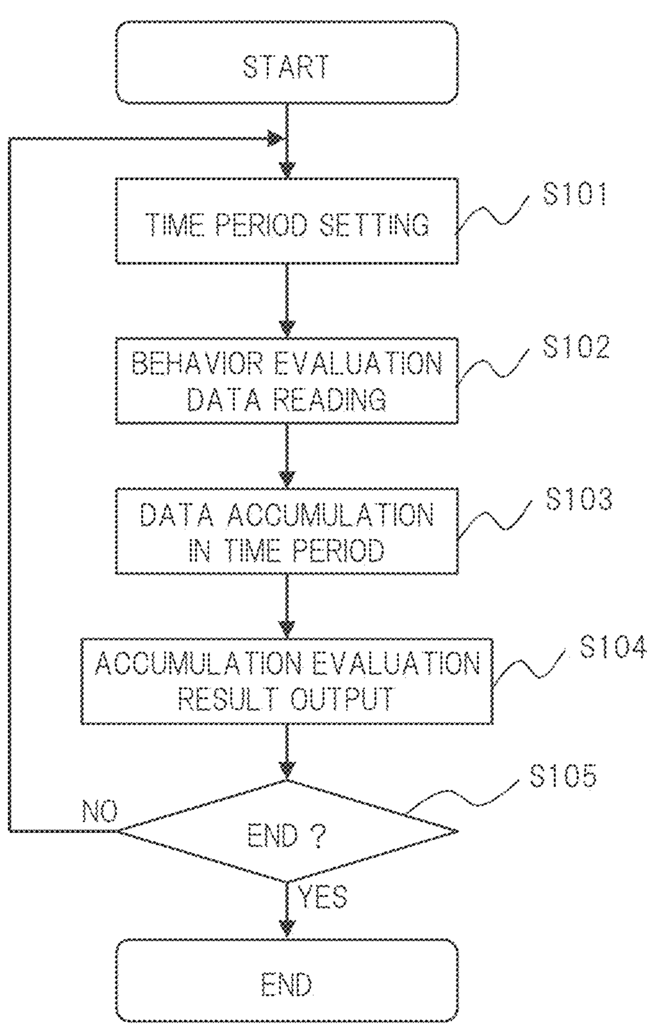
FIG. 9 is a flowchart illustrating a processing for acquiring an accumulated behavior evaluation result.

FIG. 9 is a flowchart illustrating a processing for acquiring an accumulated behavior evaluation result. Here, the accumulated behavior evaluation result can be defined as an accumulated value of behavior evaluation scores in a specific period, and can be acquired by executing the behavior evaluation program 92.

The behavior evaluation score described above in FIG. 8 is an evaluation score normalized by a behavior time period, i.e., an evaluation result related to a so-called "behavior quality". On the other hand, the accumulated evaluation score to be found according to a flow illustrated in FIG. 9 is an evaluation score obtained by accumulating evaluation scores for each evaluation time in a specific period without being normalized and corresponds to a so-called "behavior amount". Here, the "specific period" can be optionally set in units such as "one day", "one week", "one month", and "one year".

In step S101 after the start of a processing for acquiring an accumulated evaluation score, the main processor 17 sets the above-described "specific period" in response to an operation (setting instruction) by a user (wearer), for example.

In subsequent step S102, the main processor 17 sequentially reads evaluation data in the set period. Then, in step S103, the main processor 17 accumulates (sequentially adds) evaluation scores in the set period, and accumulates all the evaluation scores in the period, and then the processing proceeds to step S104. In step S104, the main processor 17 outputs an accumulated value finally obtained as an accumulated evaluation result.

In subsequent step S105, the main processor 17 determines whether or not the processing for acquiring the accumulated evaluation score is finished.

Here, if it is determined that the processing for acquiring the accumulated evaluation score has not yet been finished (step S105: NO), the processing returns to step S101, described above, and the main processor 17 repeatedly performs the above-described processes. At this time, the user sets different specific periods, for example, and therefore can recalculate and output different accumulated evaluation scores.

On the other hand, if it is determined that the processing for acquiring the accumulated evaluation score has been finished (step S105: YES), the main processor 17 finishes the above-described series of processes.

Figures 10A, 10B:
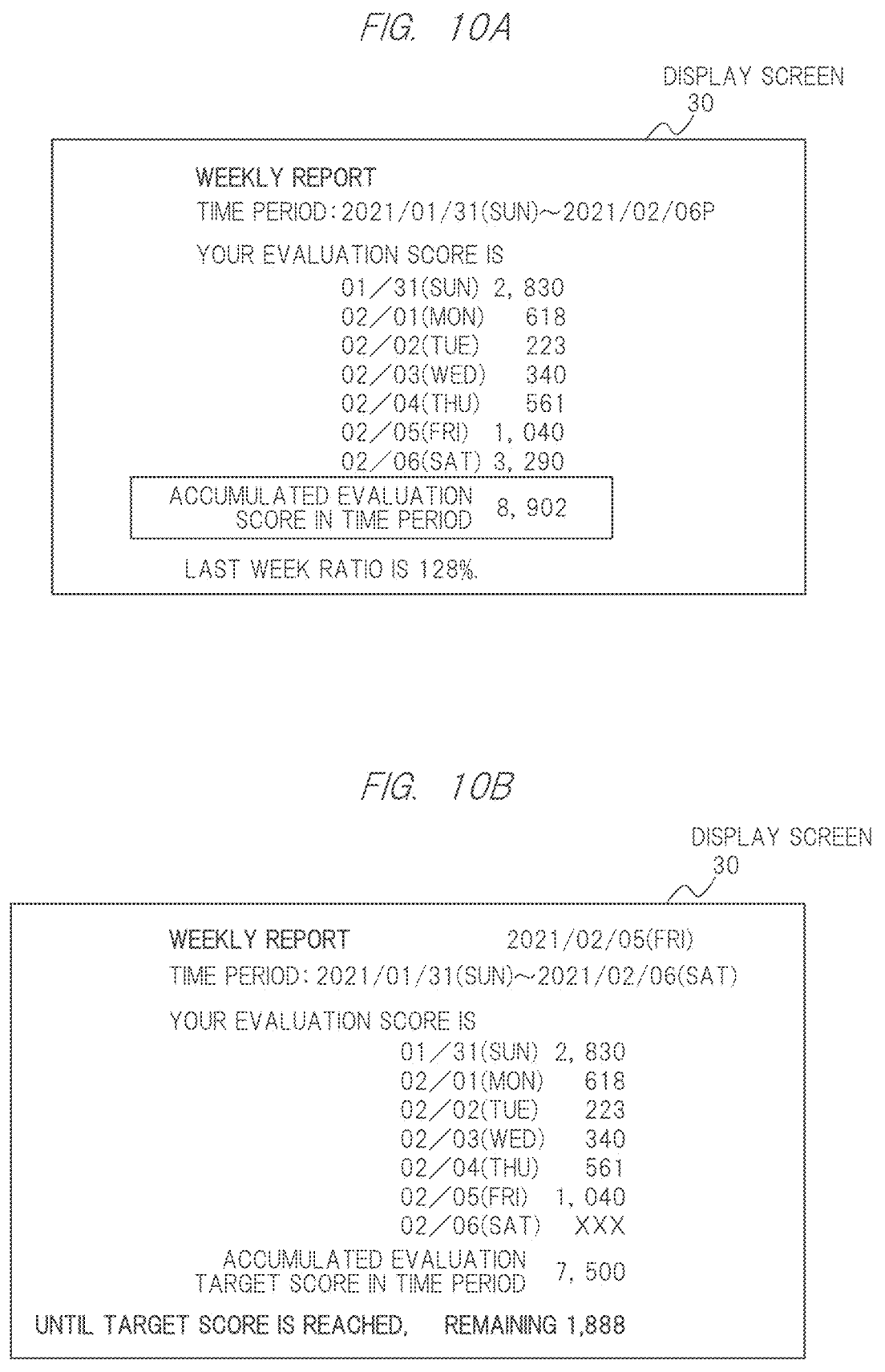

FIGS. 10A and 10B are diagrams each illustrating a display example of an accumulated behavior evaluation result. Among them, FIG. 10A illustrates the display example of the accumulated behavior evaluation result in a case where an evaluation period has been completed. On the other hand, FIG. 10B illustrates the display example of the accumulated behavior evaluation result in a case where the evaluation period has not yet been completed (is in progress). Specifically, in a case where an evaluation target period is set to January 31 (Sun), 2021 to February 6 (Sat), 2021, FIG. 10B illustrates a case where a display period is February 5 (Fri) in the period.

As illustrated in each of FIGS. 10A and 10B, an evaluation period (one week in this example) previously set and an accumulated evaluation score in the evaluation period are illustrated. In this example, the evaluation period is set to one week, and an accumulated evaluation score in units of one day and further an accumulated evaluation score in units of one week are illustrated. A wearer who has seen such evaluation scores can self-manages a target of a behavior pattern in one week such that the wearer interacts on holidays when he/she hardly interacts on weekdays.

Further, if the period has been completed, the accumulated evaluation score for this week calculated this time is displayed to also indicate a ratio thereof to an accumulated evaluation score calculated last time (last week), as illustrated on the lower stage side of FIG. 10A. On the other hand, in a case of FIG. 10B where the period has not yet been completed, remaining points required f a target score for one week is reached (an evaluation score (1888) to be acquired on February 6 (Sat), the final day, in this example) is displayed, as illustrated on the lower stage side of the same drawing.

The above-described display is performed, thereby making it possible to help to raise a motivation of the wearer or draw up a new target and behavior guideline for the next week, for example.

As described above, the wearable device 1 according to the first embodiment makes it possible to provide a wearable device having a behavior evaluation function for evaluating a direct behavior between a wearer and a target person to become aware of, for example, the behavior. Further, the wearable device has a feature of eliminating the necessity of wearing anything on the target person and therefore capable of freely selecting the target person (having a high degree of freedom of selecting the target person).

Note that although an integrated HMD (head mounted display) is illustrated here as an example of a specific configuration of the wearable device 1, the present invention is not limited to this. Another configuration example of the wearable device 1 may have a configuration in which a controller 21 (a subject image processor, a distance image processor, and an output processor) is separated from an HMD (a camera 10, a distance measurer 11, an image display 13, etc.). Alternatively, as another configuration example, a camera 10, a distance measurer 11, and the like may be arranged in a neck-type or watch-type wearable device.

Second Embodiment

Then, a second embodiment will be described with reference to FIGS. 11 to 13.

Figures 11, 12:
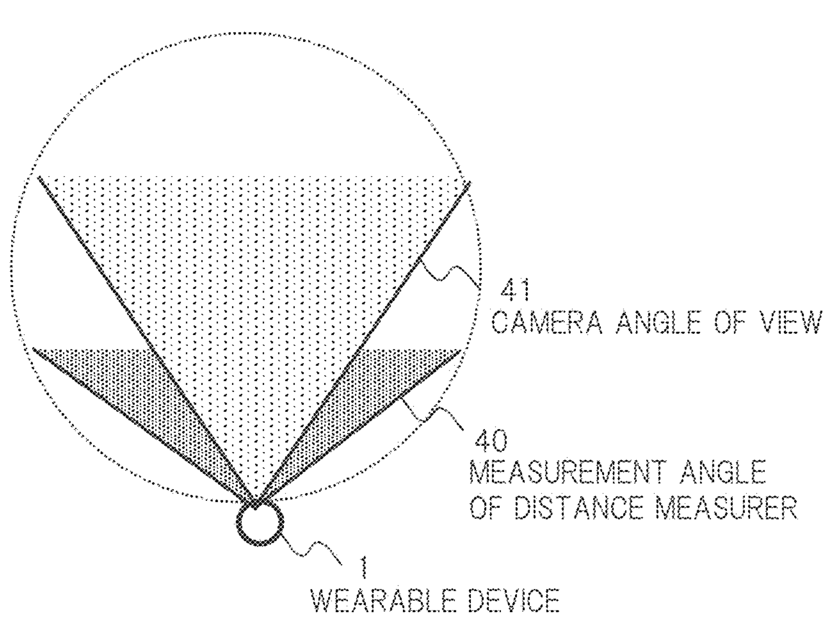
FIG. 11 is a diagram illustrating a relationship between an angle of view of a camera and a measurement angle of a distance measurer in a second embodiment.
FIG. 12 is a diagram illustrating processing for tracking a target person from a distance image.

FIG. 11 is a diagram illustrating a relationship between an angle of view of a camera and a measurement angle of a distance measurer in the second embodiment. As illustrated by comparison in FIG. 11, in the second embodiment, a measurement angle 40 of a distance measurer 11 is set wider than an angle of view of the camera 10 (a camera angle of view 41). Examples of a method for widening the measurement angle 40 of the distance measurer 11 include a method for widening a scan range of laser light to be outputted from a light source described above and a method using a plurality of distance measurers (an optical radar, etc.) in combination, and either one of these may be used.

FIG. 12 is a diagram illustrating a processing for tracking a target person from a distance image. In FIG. 12, a distance image 51 to be generated by the distance measurer 11 is illustrated in an outer frame, and a region 50 of a camera image to be generated with the camera 10 is illustrated in an inner frame of the distance image 51.

Referring to FIG. 12, it is found how a target person captured at a substantial center (a position indicated by reference sign 52*a*) in the camera image 50 at the beginning sequentially moves to each of positions indicated by reference signs 52*b*, 52*c*, and 52*d* in a time-series order. Here, the position indicated by reference sign 52*b* is on the right end side inside the camera image 50, and the positions respectively indicated by reference signs 52*c* and 52*d* are positions on the right side outside the camera image 50 and inside the distance image 51. A non-target person 53 is captured at a position on the left side outside the camera image 50 and inside the distance image 51. Note that a region 50 of the camera image is also a region inside the distance image 51, and therefore is a region where the camera image and the distance image overlap each other and is also hereinafter referred to as a "composite region 50".

Here, a controller 21 (mainly a main processor 17: the same applies hereinafter) in an HMD according to the present embodiment determines a target person (and thus a person to be set) by analyzing the camera image in the composite region 50. Even if face recognition cannot be performed because the person to be set moves to change its direction after being recognized, for example, the person to be set can be recognized by person detection. More specifically, a person at each of the positions indicated by reference signs 52*a* and 52*b* in the composite region 50 can be easily identified as a person to be set in a distance image corresponding to a person to be set to be recognized by a camera image. Therefore, the controller 21 extracts, as a function of the distance image processor, a feature of a person (which is not limited to a target person or a person to be set) in a distance image, a size of the person, a body balance, a motion vector, and the like as feature amounts.

An example illustrated in FIG. 12 illustrates a case where the person to be set (the same target person) sequentially moves to the respective positions indicated by reference signs 52*b*, 52*c*, and 52*d* from the position indicated by reference sign 52*a*. Here, persons respectively indicated by reference signs 52*c* and 52*d* are at positions outside a range of the camera image. On the other hand, the controller 21 recognizes that the person to be set (the same target person) has moved as a result of extracting a feature of a person in the distance image, a size of a person, a body balance, a motion vector, and the like as feature amounts and comparing a feature amount of a person at the position indicated by reference sign 52*c* with respective feature amounts of persons that have been at the positions indicated by reference signs 52*a* and 52*b*. Similarly, the controller 21 recognizes that a person at the position indicated by reference sign 52*d* is the person to be set (the same target person) that has moved from the position indicated by reference sign 52*c*. On the other hand, the controller 21 can judge that a person indicated by reference sign 53 is not the same target person (is a non-target person) due to its movement amount being excessively larger than a movement amount to be estimated from a motion vector of the person at the position indicated by reference sign 52*a* or the like, a difference in body balance, and the like.

Figure 13:
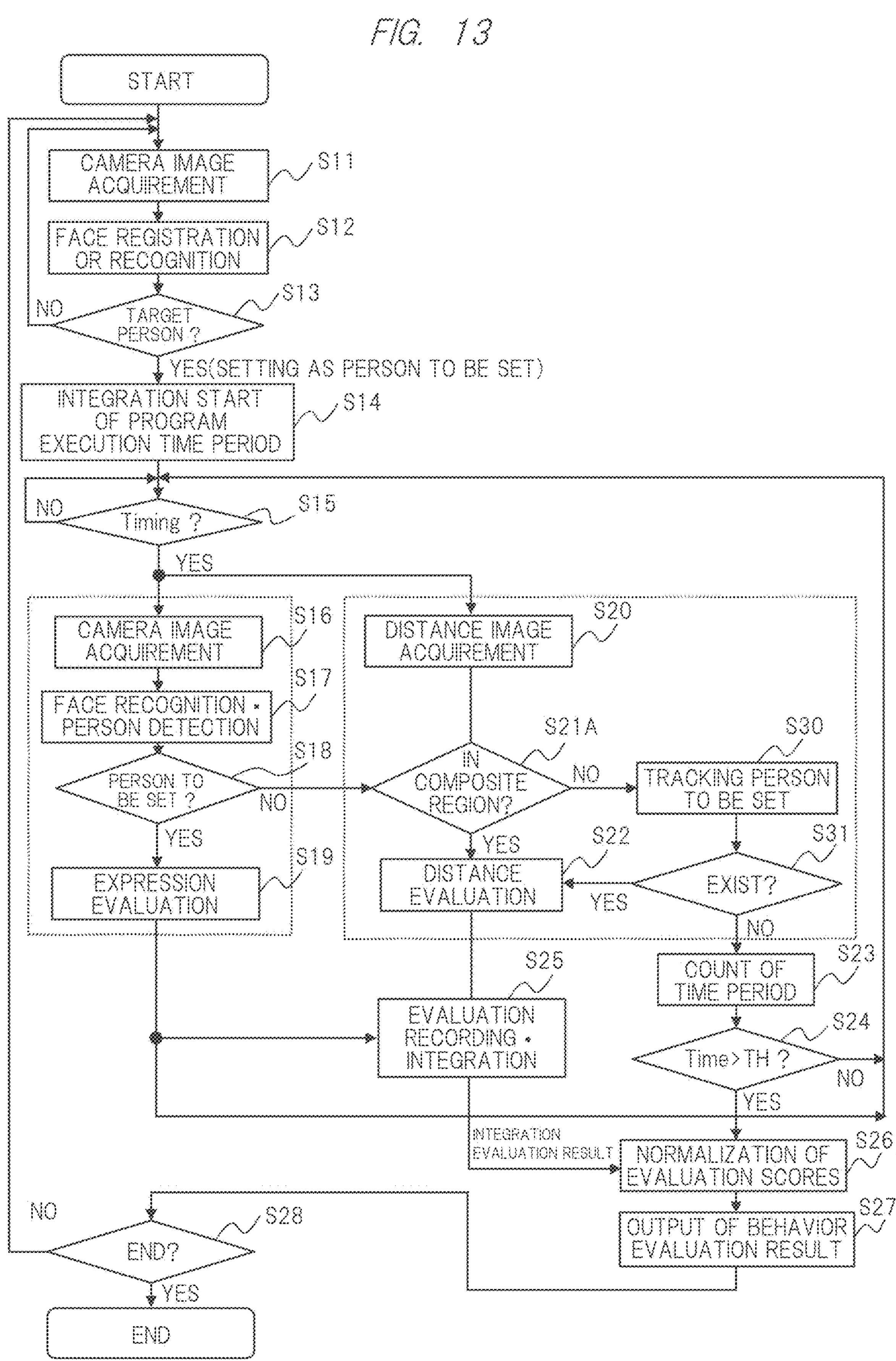
FIG. 13 is a flowchart illustrating a processing to be performed by a controller in the second embodiment.

FIG. 13 is a flowchart illustrating a processing to be performed by the controller in the HMD in the second embodiment. The flowchart illustrated in FIG. 13 corresponds to the flowchart described above in FIG. 4, and the main processor 17 that has read and executed a behavior evaluation program 92 is similarly a subject of the processing. In FIG. 13, steps of performing similar processes to those in the first embodiment described above in FIG. 4 are respectively denoted by the same reference numbers. In the second embodiment, respective processes in steps S30 and S31 added to distance image processing processes differ from those in the flow of processes illustrated in FIG. 4. Further, a process in step S21 at a branch destination of NO in determination in step S18 in camera image processing processes and in distance image processing processes also slightly differs from that in the first embodiment (includes a determination process), and therefore is denoted by reference sign S21A.

In the second embodiment, a determination result of step S18 in the camera image processing processes is NO (that is, it is determined that the person to be set (set target person) is not captured in the camera image), the main processor 17 judges that an expression evaluation (step S19) cannot be performed, and the processing proceeds to step S21A.

The main processor 17 determines whether or not the person to be set (set target person) is within the above-described composite region 50 in step S21A after a result indicating that the person to be set has not been captured in the camera image is obtained.

Here, if it is determined that the person to be set is within the composite region 50 (step S21A: YES), the main processor 17 performs processes in step S25 and subsequent steps through a distance evaluation in step S22, like in the flow illustrated in FIG. 4.

On the other hand, if it is determined that the person to be set is not within the composite region 50 (step S21A: NO), the main processor 17 detects a person within the distance image, and performs a process for tracking the person to be set (step S30), as described above in FIG. 12. The process in step S30 is performed, thereby making it possible to confirm whether or not the person to be set exists in a wider region that is outside the camera image, i.e., cannot be captured in the camera image.

In subsequent step S31, the main processor 17 determines whether or not the person to be set exists in the distance image. Here, if it is determined that the person to be set exists in the distance image (step S31: YES), the main processor 17 performs processes in step S25 and subsequent steps through the distance evaluation in step S22, like in the flow illustrated in FIG. 4.

On the other hand, if it is determined that the person to be set does not exist in the distance image (step S31: NO), the main processor 17 performs processes in step S23 and subsequent steps, like in the flow illustrated in FIG. 4.

Specifically, in step S23, the main processor 17 starts to count a time period during which the person to be set cannot be confirmed (here, a time period during which the determination of step S21A: NO is repeated). In subsequent step S24, the main processor 17 determines whether or not the counted time period has exceeded a threshold value TH.

Here, if it is determined that the counted time period has not yet exceeded the threshold value TH (step S24: NO), the processing returns to step S15, and the main processor 17 repeats the above-described processes. On the other hand, if it is determined that the counted time period has exceeded the threshold value TH (step S24: YES), the main processor 17 judges that a behavior of a user (wearer) toward the person to be set has almost been finished, and the processing proceeds to step S26.

Note that processes in step S27 and step S28 are the same as those in the flow illustrated in FIG. 4.

Thus, according to the second embodiment, a similar effect to that of the wearable device 1 in the first embodiment is obtained, and a unique effect, described below, is obtained. That is, according to the wearable device 1 in the second embodiment, a behavior evaluation having a higher trackability to movement of the target person (person to be set) can be performed utilizing the distance measurer 11 having a characteristic wide angle of measurement.

Third Embodiment

Figure 16:
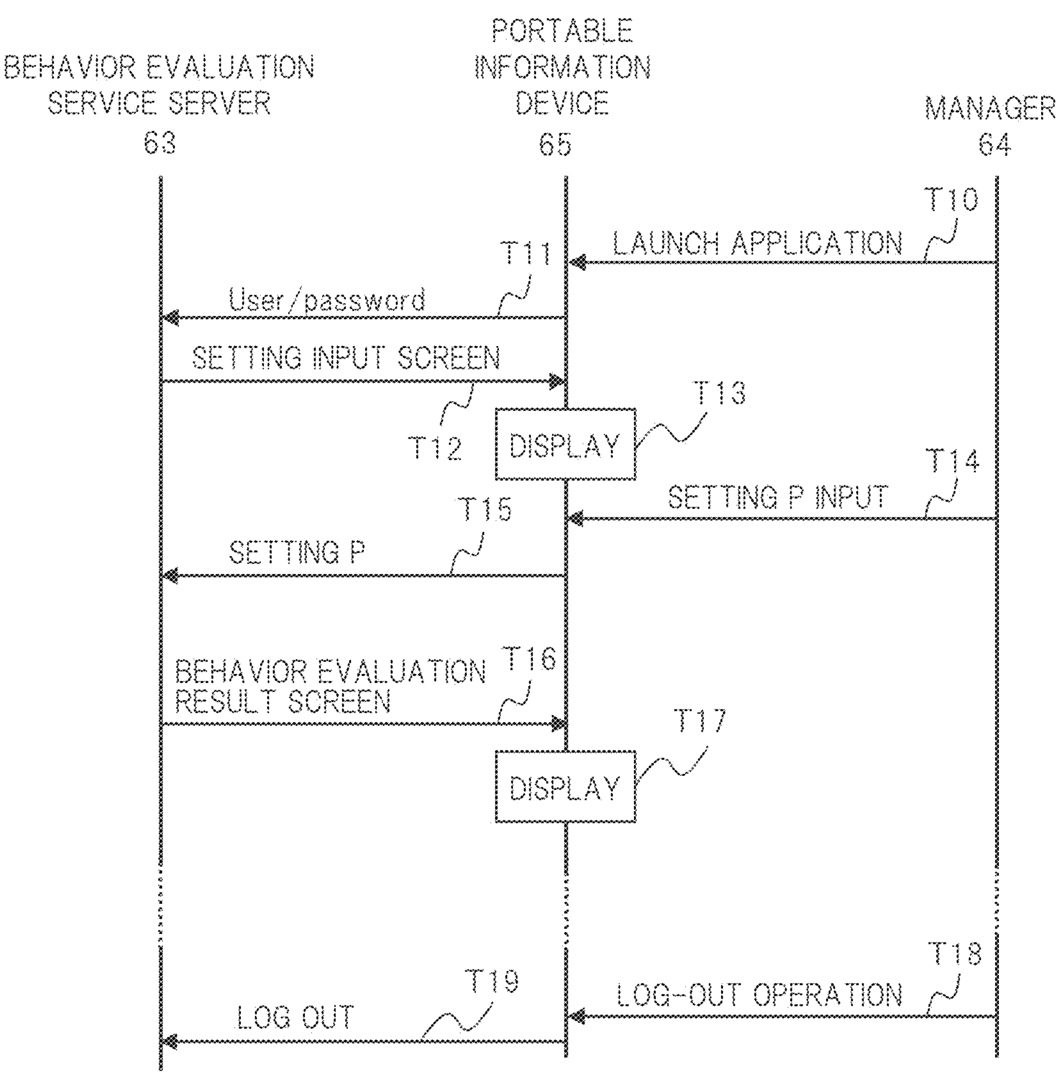
FIG. 16 is a sequence diagram of a case where the behavior evaluation result is monitored.

Then, a third embodiment of the present disclosure will be described with reference to FIGS. 14 to 16.

Figure 14:
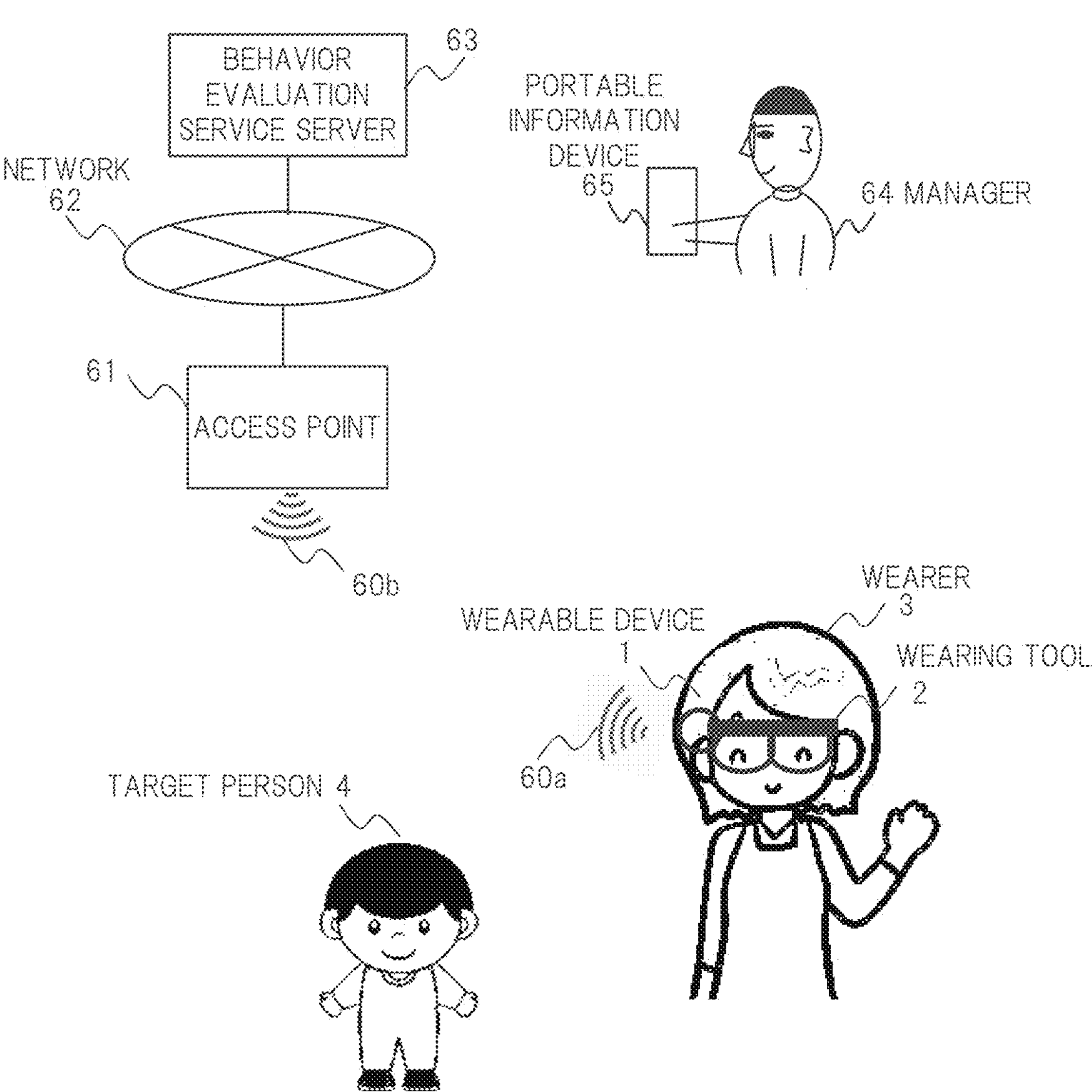
FIG. 14 is a diagram illustrating a configuration of a third embodiment and shows a system configuration of a behavior evaluation system including a wearable device.

FIG. 14 is a diagram illustrating a configuration of the third embodiment, illustrating a system configuration of a behavior evaluation system including a wearable device. In FIG. 14, an administrator 64 concerned with a wearer 3 or a target person 4 is further added besides the wearer 3 and the target person 4 in the first embodiment described above in FIG. 2.

Examples include an example in which the wearer 3 is a babysitter and the administrator 64 is an employer of the babysitter (i.e., a person concerned with the wearer 3). As another example, the administrator 64 may be a person concerned with the target person 4 (e.g., a guardian such as a parent). In either case, the behavior evaluation system in the third embodiment has a configuration in which the administrator 64 can possess a portable information device 65 and confirm an evaluation result of a behavior of the wearer 3 (the babysitter) toward the target person 4 online using the portable information device 65.

Note that the administrator 64 may use not only the portable information device 65 as illustrated in FIG. 14 but also another information terminal such as a stationary PC in confirming such a behavior evaluation result online. On the other hand, when the portable information device 65 is used, there is an advantage that a behavior evaluation result can be confirmed without selecting a location such as a destination.

In FIG. 14, a block having a similar function to that illustrated in FIG. 2 is denoted by the same number. In FIG. 14, when differences from FIG. 2 are further described, a server apparatus (a behavior evaluation service server 63) capable of communicating with the wearable device 1 and the portable information device 65 is used in the behavior evaluation system in the third embodiment.

The behavior evaluation service server 63 is arranged in a network 62 such as a LAN or the Internet, and can wirelessly communicate with the wearable device 1 and the portable information device 65 through an access point 61. FIG. 14 illustrates how a communicator 16 in the wearable device 1 (see FIG. 1) and the behavior evaluation service server 63 via the access point 61 communicate with each other through wireless communication signals 60*a* and 60*b*.

In one specific example in the behavior evaluation system (hereinafter referred to as "this system" as appropriate), the wearable device 1 sends out data such as an expression evaluation score generated in step S19 and a distance evaluation score generated in step S22 to the behavior evaluation service server 63. The behavior evaluation service server 63 that has received the data performs the above-described processes in step S25 (recording and storage of a behavior evaluation result) and succeeding steps on behalf of or in parallel with one another. Further, an integrated value of the behavior evaluation result is stored in a memory medium (an HDD, etc.) in the behavior evaluation service server 63, and the administrator 64 can monitor the stored behavior evaluation result using the portable information device 65.

Hereinafter, the behavior evaluation result stored in the behavior evaluation service server 63 (hereinafter abbreviated as "server" as appropriate) and monitored by: the portable information device 65; a flow of use of this system; and the like will be described with reference to FIGS. 15 and 16. Here, FIG. 15 is a diagram for explaining a data configuration of the behavior evaluation result. FIG. 16 is a sequence diagram in a case where the behavior evaluation result is monitored.

In this system, a person who uses a service is assigned a service ID (Service ID) when logged into the server in the network 62 by inputting Username previously registered. The service ID illustrated in FIG. 15 is as long as “550e8400-e29b . . . ”. In this case, a service user (the administrator 64 in this example) inputs the assigned Service ID (“550e8400-e29b . . . ”) by an operation such as drag & drop, whereby a data display screen 70 as illustrated in FIG. 15 is displayed on a display of the portable information device 65.

In an example illustrated in FIG. 15, a plurality of data sets (two data sets, i.e., a data set 71 and a data set 72) each storing behavior evaluations of the wearer of the wearable device 1 are displayed. Hereinafter, respective data configurations of the data sets 71 and 72 will be described in this order.

A behavior evaluation score (Score) is displayed at the top of the data configuration. Here, on the data set 71, a score “71” is displayed as a value of a behavior evaluation result in which a calculation processing has already been completed (in other words, the above-described normalization in step S26 has been performed).

Further, a start time (Start Time) and a stop time (Stop Time) of the behavior evaluations are displayed in a column below the behavior evaluation score (Score). In the data set 71, 9:15:37 a.m. on Jan. 26, 2021 is displayed as the start time, and 12:0:12 p.m. on the same day of the same year is displayed as the stop time. Therefore, the service user (the administrator 64) can know in which time zone the behavior of the wearer has been evaluated.

Further, sets of expression evaluation scores and distance evaluation scores are recorded in time series for each predetermined interval (see T in FIG. 5) in a column below the stop time. The foregoing data are collected together to constitute the data set 71. In one example, this data set 71 corresponds to the period NT illustrated in FIG. 5.

In the example illustrated in FIG. 15, the data set 72 follows below the above-described data set 71. Note that a data structure of the data set 72 is similar to that of the data set 71, and therefore a difference therefrom will be described below.

In the data set 72, a behavior evaluation result has not yet been determined. Accordingly, a numerical value of the score has not been displayed. Specifically, the data set 72 is data of a behavior evaluation result evaluated next to the time zone in the data set 71. Although 13:22:46 on Jan. 26, 2021 is displayed as the start time, “running”, i.e., an indication that the data set 72 is in progress and the evaluation has not yet been completed is displayed as Stop Time.

Therefore, the service user (administrator 64) can browse a behavior evaluation and a result in the morning of the wearer by seeing the data set 71 in the data display screen 70 displayed on the display of the portable information device 65. Further, the administrator 64 can monitor a behavior evaluation in the afternoon of the wearer in real time by seeing the data set 72 that is displayed (updated) as being currently in progress in the data display screen 70.

In one specific example, after being connected to the behavior evaluation service server 63, the portable information device 65 acquires a list of start times of behavior time periods on the specified day from the behavior evaluation service server 63 and displays the list on the display by a predetermined operation (e.g., an operation for specifying a date) of the service user (the administrator 64). In this case, the portable information device 65 can display the data display screen 70 as illustrated in FIG. 15 by specifying any one of the start times in the list. Note that the data display screen 70 may be configured such that when any one of the start times in the list is specified, as described above, only a data set (e.g., only one of the data set 71 and the data set 72 in FIG. 15) corresponding to the start time is acquired and displayed.

From another aspect, the behavior evaluation service server 63 transmits to the portable information device 65 data (a behavior evaluation score and an expression evaluation score and a distance evaluation score as elements of the behavior evaluation score) on the data display screen 70 corresponding to the start time of the behavior time period specified by the portable information device 65 (an external apparatus).

The above-described configuration makes it possible for the service user (the administrator 64) to display and browse the expression evaluation score, the distance evaluation score, and the behavior evaluation score on the portable information device 65 using the start time of the behavior time period as a search index.

As another example, the data display screen 70 as illustrated in FIG. 15 (both or one of the data sets 71 and 72 as illustrated in FIG. 15) may be configured to be displayed by the image display 13 in the wearable device 1 using the start time of the behavior time period as a search index.

Then, a flow of processes in a case where the administrator 64 monitors the behavior evaluation of the wearer using the portable information device 65 in real time will be described with reference to FIG. 16. In FIG. 16, reference symbols T10 to T19 respectively represent time periods elapsed until the service is finished being used (logged out) since an application (hereinafter abbreviated as “app” in Japanese) previously stored (installed) in the portable information device 65 is started.

First, the administrator 64 operates the portable information device 65, to launch the above-described application (time T10). When the application is launched, the portable information device 65 (a processing subject is a processor of the portable information device 65; the same applies hereinafter) sends out Username and Password previously set to the behavior evaluation service server 63 at time T11, and acquires the ServiceID (see FIG. 15 as appropriate) from the behavior evaluation service server 63 and receives a setting input screen not illustrated at subsequent time T12.

The setting input screen is displayed on the display of the portable information device 65 at time T13. At subsequent time T14, the administrator inputs a setting parameter (“setting P” in the drawing). The inputted setting parameter is transmitted to the behavior evaluation service server 63 at time T15. In one specific example, the setting parameter is a start time in a data set desired to be monitored, and is directly inputted or selected via a pull-down menu in this case. Further, the setting parameter may include a parameter for selecting a display format of monitoring. Examples of an example of selecting the display format of monitoring include an example of making display in a tabular format like the data set 72 illustrated in FIG. 15, graphical display as illustrated in FIG. 5, or the like selectable.

Thus, the behavior evaluation service server 63 that has received the above-described setting parameter sends out data on a behavior evaluation result screen corresponding to the setting parameter (time T16). The portable information device 65 that has received the data on the behavior evaluation result screen displays the behavior evaluation result screen on the display of its own at time T17 (see FIG. 15 as appropriate). The administrator 64 operates the portable information device 65 to perform a processing for logout in order to finish the application when finishing monitoring the behavior evaluation result screen (time T18). The behavior evaluation service server 63 finishes the service and connection to the portable information device 65 when receiving a signal for the logout (time T19).

As described above, the third embodiment has a feature that the administrator 64 can confirm a behavior evaluation result of the wearer online and further monitor the behavior evaluation result in real time, for example, in addition to effects respectively obtained in the above-described first and second embodiments.

Fourth Embodiment

A fourth embodiment of the present disclosure will be described with reference to FIGS. 17 to 20.

Figure 17:
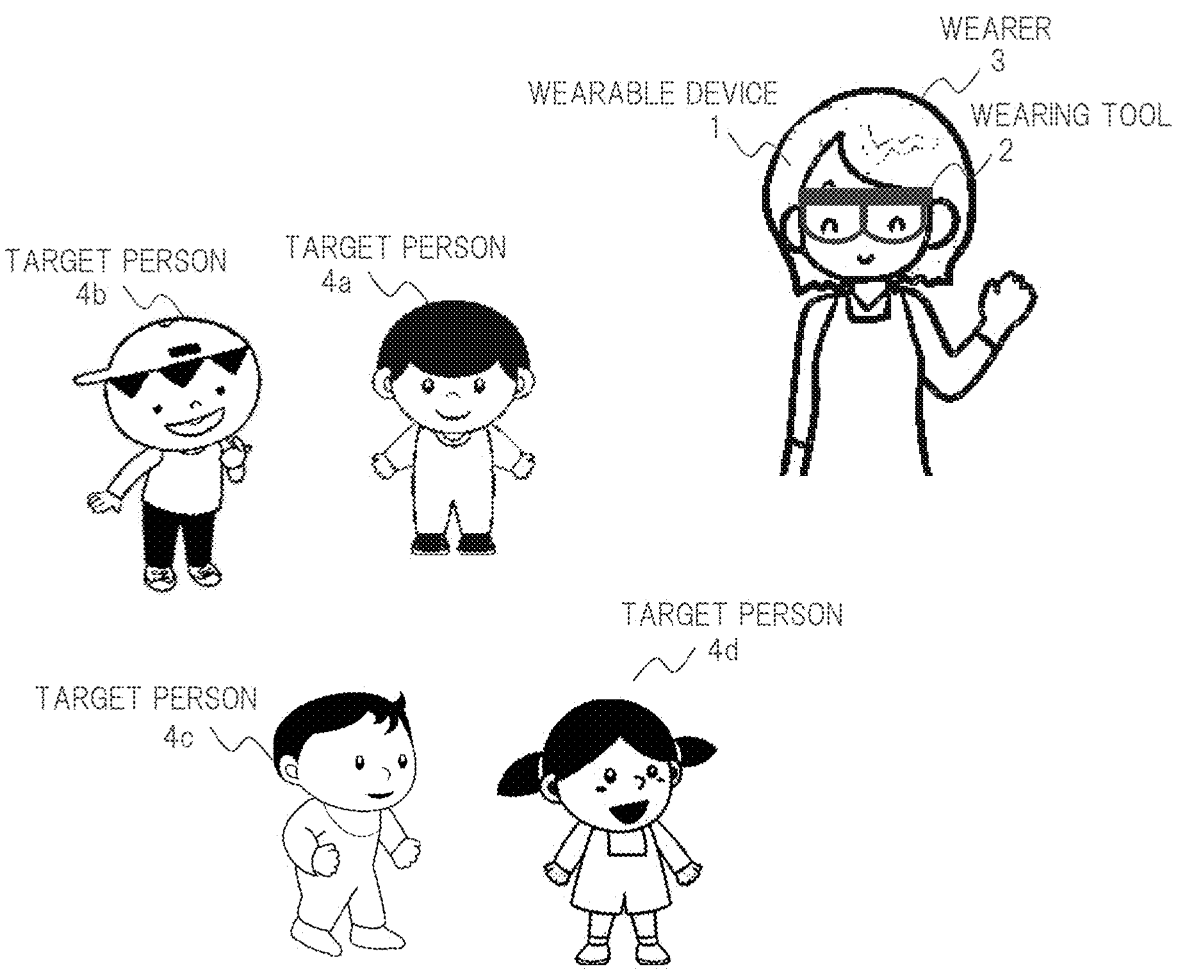
FIG. 17 is a diagram for explaining a scene where a plurality of target persons exist.

FIG. 17 is a diagram illustrating a case where a plurality of target persons exist. FIG. 17 illustrates a relationship between a wearer 3 and a target person 4, and presupposes here a case where a plurality of target persons 4 exist (four target persons respectively indicated by reference symbols 4*a*, 4*b*, 4*c*, and 4*d* in this example).

Examples of one specific example include a case where a nursery teacher takes care of a plurality of nursery school children in a nursery school and a behavior of the nursery teacher toward the nursery school children is evaluated. In this case, the nursery teacher is the wearer 3 of a wearable device 1 (HMD), and each of the nursery school children 4 (4*a* to 4*d*) is the target person. The target person need not wear anything, for example.

Another specific example may be applied to a caregiver (wearer 3) and a care-receiver in a care facility, a teacher (wearer 3) and a student in a place of education, a clerk (wearer 3) and a customer (person to be served) in a store, and the like.

Figure 18:
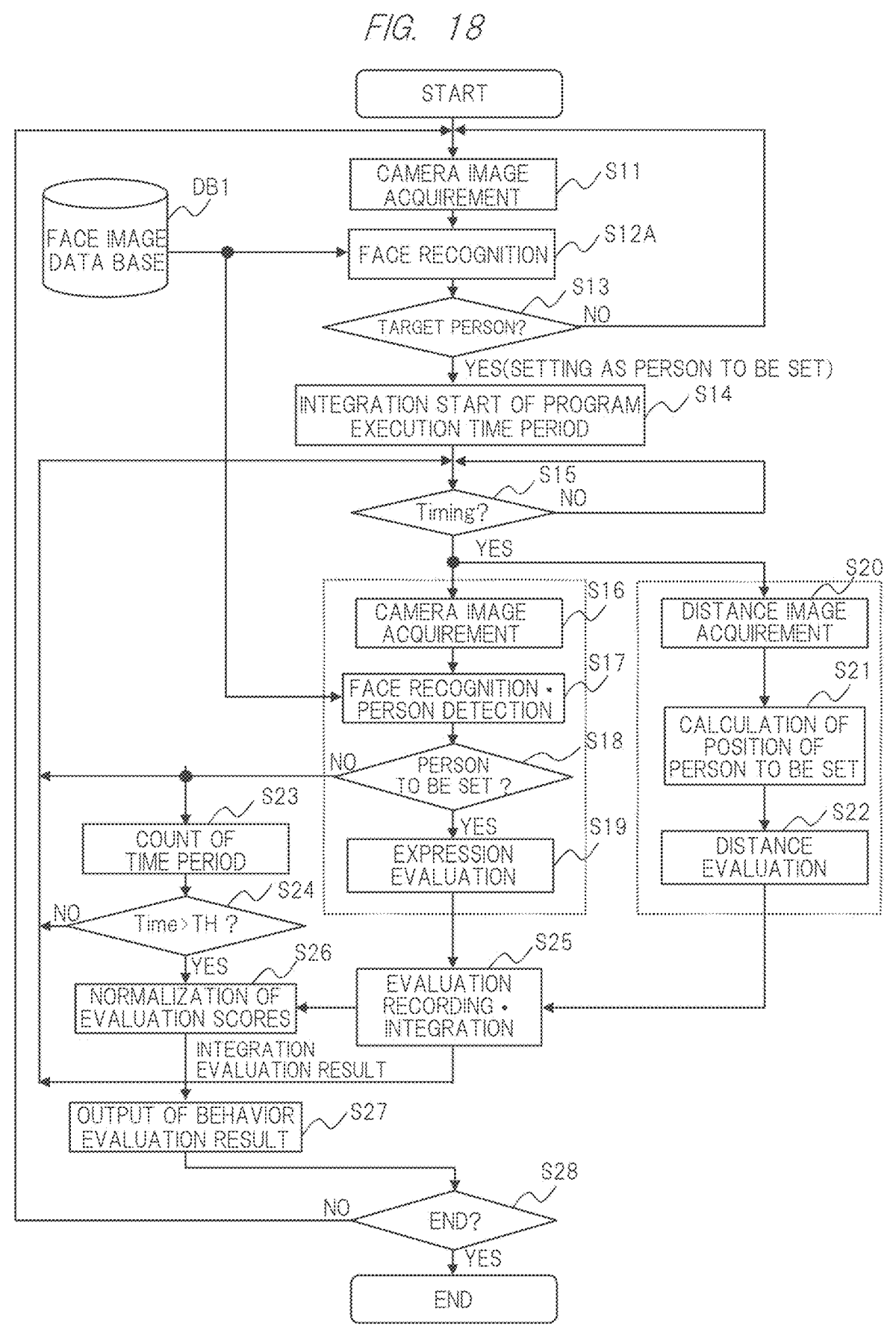

FIG. 18 is a flowchart illustrating an example of processing to be performed by the wearable device 1 in the fourth embodiment. In FIG. 18, a step of performing a similar process to that in the flow of the processes in the first embodiment illustrated in FIG. 4 is denoted by the same number.

FIG. 18 differs from FIG. 4 in that a face image database DB1 is used. That is, in the fourth embodiment, face data of all target persons are previously stored in the face image database DB1.

Then, in a face recognition step (step S12A) after a camera image is acquired in step S11, a main processor 17 subjects a face captured in the acquired camera image to a face recognition processing based on comparison with the face data previously registered in the face image database DB1. A process in subsequent step S13 is similar to that illustrated in FIG. 4.

Similarly, in a face recognition and person detection step (step S17) after a camera image is acquired in step S16, the main processor 17 subjects a face captured in the acquired camera image to a face recognition processing based on comparison with the face data previously registered in the face image database DB1. Processes in step S18 and subsequent steps are similar to those illustrated in FIG. 4.

Note that more specifically, the main processor 17 refers to face image data corresponding to the number of target persons registered in the face image database DB1 in the face recognition processing in step S12A and the face recognition and person detection the processing in step S17. Then, the main processor 17 performs processing for each of the target persons in each of processes such as an expression evaluation in step S19, a distance evaluation in step S22, evaluation recording and integration in step S25, and normalization of an evaluation result in step S26.

FIG. 19 is a diagram for explaining a configuration of a database of a behavior evaluation result corresponding to the plurality of target persons. In an example illustrated in FIG. 19, a plurality of data sets (two data sets, i.e., a data set 73 and a data set 74) each storing behavior evaluations of the wearer of the wearable device 1 are displayed, like in FIG. 15 previously described. For ease of understanding, the data set 73 represents the same time zone as that in the data set 71 illustrated in FIG. 15, i.e., a start time (Start Time) and a stop time (Stop Time) of the behavior evaluation.

Further, as can be seen from comparison with FIG. 15, in the data set 73 illustrated in FIG. 19, the behavior evaluation result includes sub data sets for target persons A, B, C, and D respectively denoted by reference symbols 73*a* to 73*d*. In other words, a configuration of the fourth embodiment using the face image database DB1 makes it easy to perform respective processes such as evaluations of behaviors of the wearer toward the plurality of target persons (the target persons A, B, C, and D in this example) in a simultaneous and parallel manner for each of the target persons.

Figure 20:
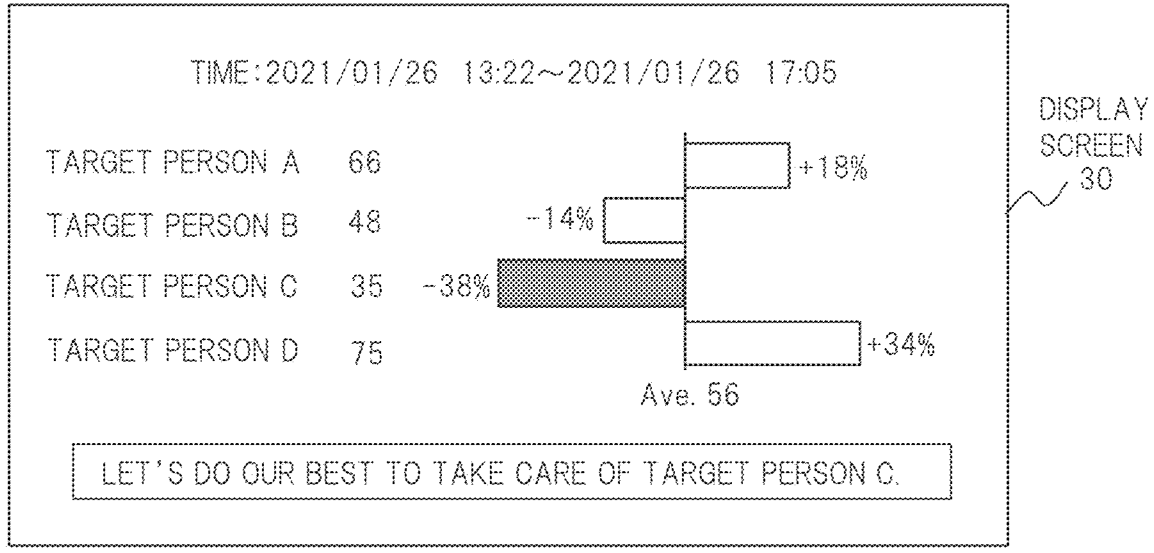
FIG. 20 is a diagram illustrating a display example of the behavior evaluation results.

Further, FIG. 20 is a diagram illustrating a display example of the behavior evaluation result in the fourth embodiment. The behavior evaluation result is outputted to an image display 13 in the wearable device 1 on the basis of a control signal of a controller 21 (an output processor) as a display screen 30. Note that the controller 21 in the wearable device 1 may transmit data on the display screen 30 to a behavior evaluation service server 63 via a network 62 described above. In this case, the display screen 30 can be displayed on a display of a portable information device 65 connected to the behavior evaluation service server 63.

In an example of the display screen 30 illustrated in FIG. 20, evaluation scores (66, 48, 35, and 75) are respectively displayed for the target persons (A, B, C, and D), and comparison results of the evaluation scores for the target persons are respectively displayed by graphs. Further, in this example, a difference for each of the target persons (A, B, C, and D) from 65 as an average (Ave.) of the above-described evaluation scores is displayed in terms of percentage. Further, in this example, the graph for the target person C that is the lowest in evaluation is displayed in a color different from those of the graphs for the other target persons A, B, and D.

The above-described display on the display screen 30 is performed, thereby making it possible to indicate that the behavior evaluation for the target person C is relatively inferior to those for the other target persons (A, B, and D), for example, for easier visual understanding. Further, in this example, an advice (a message output) "Let's do our best to take care of target person C." is presented as a general comment. Note that this advice (message output) may be outputted as a voice from a voice input/output 14 alternatively or additionally.

As another example of the display screen 30, the evaluation score for the specific target person (e.g., the target person C) may be displayed in time series over a plurality of behavior evaluation time periods under control of the controller 21 corresponding to an operation of an operation input 15 by a user, for example. Alternatively, the display screen 30 of a behavior evaluation corresponding to a start time of a behavior time period may be displayed using the start time as a search index under the control of the controller 21 corresponding to the operation of the operation input 15 by the user, for example.

Thus, a configuration of the fourth embodiment in which the evaluation score (the behavior evaluation score of the wearer 3) is displayed for each of the target persons (A, B, C, and D) has a feature of objectively performing a behavior evaluation for each of the target persons and easily obtaining a feedback of a behavior. Further, as illustrated in FIG. 20, a configuration in which the respective behavior evaluation scores for the target persons (A, B, C, and D) are graphed and are comparatively displayed as a list makes it possible to easily grasp an evaluation result for each of the target persons even if a region where the display screen 30 is displayed is small, for example. In addition, a configuration in which a general comment on the behavior evaluation is outputted makes it possible to rapidly grasp points to be regretted this time for the wearer 3.

Note that the present invention is not limited to the specific examples of the embodiments described in FIGS. 1 to 20. For example, some of components in the certain embodiment can be replaced with those in the other embodiment. Further, some of components in the other embodiment can also be added to components in the certain embodiment. All of these belong to the scope of the present invention. Further, numerical values, messages, and the like appearing in sentences and drawings are respectively mere examples, and even if different ones are used, the effect of the present invention is not impaired.

For example, some of functions (e.g., respective functions as the subject image processor, the distance image processor, and the output processor) to be performed by the controller 21 in the wearable device 1 may be performed by the above-described behavior evaluation service server 63.

Further, the respective functions and the like of the apparatuses described in the specification and the drawings may be implemented in hardware by designing some or all of them using an integrated circuit, for example. Further, the functions and the like may be implemented in software by a microprocessor unit, a CPU, or the like interpreting and executing an operation program. Further, an implementation range of software is not limited, but hardware and software may be used together.

1: Wearable device, 2: Wearable tool, 3: Wearer, 4, 4*a* to 4*d*: Target person (person to be set), 10: Camera (imager), 11: Distance measurer, 13: Image display, 13*c*: Main screen display, 14: Voice input/output, 15: Operation input, 16: Communicator, 17: Main processor, 19: Flash ROM, 21: Controller (subject image processor, distance image processor, output evaluation program), 92: Behavior evaluation program, 93: Data (data storage), 30: Display screen, 51: Distance image, 63: Behavior evaluation service server, 64: Manager, 65: Portable information device, and DB1: Face image data base.

The invention claimed is:

1. A wearable device comprising:

an imager that photographs a target person in front of or around a wearer to generate a subject image;

a distance measurer that measures a distance between the wearer and the target person to acquire distance data;

a subject image processor that performs detection and face recognition of the target person included in the subject image and processes the subject image to assign, to the wearer, an expression evaluation score based on an expression of a face of the target person obtained by the face recognition;

a distance image processor that analyzes a distance image obtained by mapping the distance data to find a distance between the wearer and the target person and acquires a distance evaluation score corresponding to the distance; and an output processor that performs an evaluation processing for finding a behavior evaluation score for evaluating a behavior of the wearer from the expression evaluation score, the distance evaluation score, and a behavior evaluation time period as a behavior time period of the wearer as an evaluation target and outputs the behavior evaluation score.

2. The wearable device according to claim 1, wherein the output processor: starts to perform the evaluation processing from a first time point at which the target person is set as a person to be set; sets, as the behavior evaluation time period, a period from the first time point to a second time point at which the person to be set is not detected for a threshold time period from the generated subject image or the acquired distance image; and outputs the behavior evaluation score based on an integrated value of the expression evaluation score and the distance evaluation score in the behavior evaluation time period.

3. The wearable device according to claim 1, wherein the processing of the subject image by the subject image processor and the acquisition of the distance evaluation score by the distance image processor are performed at timing having a predetermined cycle.

4. The wearable device according to claim 3, wherein the output processor: integrates the expression evaluation score and the distance evaluation score for the timing having the predetermined cycle; calculates respective statistics of the integrated expression evaluation score and distance evaluation score; and performs the evaluation processing so as to set, as the behavior evaluation score, a value obtained by normalizing each of the calculated statistics by the behavior evaluation time period.

5. The wearable device according to claim 4, wherein the statistic is an average value found by addition-averaging or weighted-averaging each of the integrated expression evaluation score and the integrated distance evaluation score.

6. The wearable device according to claim 2, wherein the output processor:

integrates the expression evaluation score and the distance evaluation score per timing having a predetermined cycle; and performs the evaluation processing so as to set, as the behavior evaluation score, an accumulated value obtained by accumulating the integrated values during the behavior evaluation time period.

7. The wearable device according to claim 1, wherein the output processor outputs, to a display, a screen representing a behavior evaluation result including the behavior evaluation score.

8. The wearable device according to claim 2, wherein a measurement angle of the distance measurer capable of measuring the distance from the target person is wider than a camera angle of view of the imager, and the distance image processor extracts a feature amount of a person in the distance image to recognize the target person not included in the subject image, finds a distance between the wearer and the target person, and acquires a distance evaluation score corresponding to the distance.

9. The wearable device according to claim 2, further comprising a data storage, wherein the output processor records, in the data storage, the expression evaluation score and the distance evaluation score together with the first time point as a start time and the second time point as a stop time of the behavior evaluation time period.

10. The wearable device according to claim 2, further comprising a communicator connected to a network, wherein the output processor outputs, to a server via the communicator, the expression evaluation score and the distance evaluation score together with the first time point as a start time and the second time point as a stop time of the behavior evaluation time period.

11. The wearable device according to claim 2, wherein the subject image processor performs detection and face recognition of a plurality of target persons included in the subject image, and processes the subject image so as to assign the expression evaluation score to each of the target persons, the plurality of target persons being configured by the target person, the distance image processor analyzes the distance image to find a distance from each of the target persons, and acquires a distance evaluation score corresponding to the distance, and the output processor performs an evaluation processing for finding a behavior evaluation score for evaluating a behavior of the wearer for each of the target persons.

12. The wearable device according to claim 11, wherein the output processor outputs the behavior evaluation score for each of the target persons.

13. A behavior evaluation system comprising:

the wearable device according to claim 1; and a server that acquires the behavior evaluation score outputted from the output processor and provides the acquired behavior evaluation score to an external apparatus possessed by a person concerned with the target person.

14. The behavior evaluation system according to claim 13, wherein the server transmits, to the external apparatus, the behavior evaluation score corresponding to a start time of a behavior time period specified by the external apparatus and the expression evaluation score and the distance evaluation score as elements of the behavior evaluation score.

* * * * *